(12) United States Patent
Kim et al.

(10) Patent No.: US 11,962,356 B2
(45) Date of Patent: *Apr. 16, 2024

(54) METHOD FOR CONTROLLING CROSS-LINK INTERFERENCE, AND APPARATUS THEREFOR

(71) Applicant: LG ELECTRONICS INC., Seoul (KR)

(72) Inventors: Dongkyu Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

This patent is subject to a terminal disclaimer.

(21) Appl. No.: 17/714,610

(22) Filed: Apr. 6, 2022

(65) Prior Publication Data

US 2022/0231768 A1 Jul. 21, 2022

Related U.S. Application Data

(63) Continuation of application No. 16/476,520, filed as application No. PCT/KR2018/000201 on Jan. 4, 2018, now Pat. No. 11,329,731.

(Continued)

(51) Int. Cl.
*H04B 15/00* (2006.01)
*H04B 17/345* (2015.01)
*H04B 17/354* (2015.01)

(52) U.S. Cl.
CPC .......... *H04B 15/00* (2013.01); *H04B 17/345* (2015.01)

(58) Field of Classification Search
CPC ........ H04B 15/00; H04B 15/02; H04B 17/30; H04B 17/309; H04B 17/336;
(Continued)

(56) References Cited

U.S. PATENT DOCUMENTS 9,204,468 B2 12/2015 Tynderfeldt et al.
9,686,050 B2 * 6/2017 Rahman .............. H04W 72/541
(Continued)

FOREIGN PATENT DOCUMENTS

CN 101849366 9/2010
CN 104350790 2/2015
(Continued)

OTHER PUBLICATIONS

U.S. Appl. No. 16/476,520, Office Action dated Nov. 3, 2021, 12 pages.
(Continued)

*Primary Examiner* — Quochien B Vuong
(74) *Attorney, Agent, or Firm* — LEE, HONG, DEGERMAN, KANG & WAIMEY

(57) ABSTRACT

A method for a transmission and reception point (TRP) for controlling cross-link interference comprises the steps of: determining a timing advance (TA) value, for measuring or eliminating cross-link interference, in a set subframe if a section in which cross-link interferences occur between the TRP and one or more adjacent TRPs is configured; and transmitting the determined TA value in the set subframe to a terminal, wherein the section in which cross-link interference occurs can correspond to a section that is configured as an uplink section for the TRP, and as a downlink transmission section for the one or more adjacent TRPs.

14 Claims, 23 Drawing Sheets

Related U.S. Application Data

(60) Provisional application No. 62/443,773, filed on Jan. 8, 2017.

(58) Field of Classification Search
CPC . H04B 17/345; H04B 17/354; H04W 72/082; H04W 72/085; H04W 72/12; H04W 72/1231; H04W 72/1263; H04W 72/1278; H04W 72/1284; H04L 1/1887; H04L 5/003; H04L 5/0053; H04L 5/0073; H04L 5/0094; H04L 5/14; H04L 5/1461; H04L 5/1469

See application file for complete search history.

(56) References Cited

U.S. PATENT DOCUMENTS

| | | | | |
|---|---|---|---|---|
| 9,807,709 | B2* | 10/2017 | Deng | H04W 92/18 |
| 9,954,668 | B2 | 4/2018 | Lee et al. | |
| 10,292,093 | B2 | 5/2019 | Chendamarai Kannan et al. | |
| 10,568,052 | B2 | 2/2020 | Deng et al. | |
| 11,277,213 | B2* | 3/2022 | Xu | H04L 5/1469 |
| 11,356,860 | B2* | 6/2022 | Takano | H04B 17/336 |
| 2010/0254356 | A1 | 10/2010 | Tynderfeldt et al. | |
| 2012/0178482 | A1 | 7/2012 | Seo et al. | |
| 2013/0301489 | A1 | 11/2013 | Sirotkin et al. | |
| 2014/0160967 | A1 | 6/2014 | Gao et al. | |
| 2015/0333877 | A1 | 11/2015 | Rahman et al. | |
| 2021/0409127 | A1 | 12/2021 | Kim et al. | |

FOREIGN PATENT DOCUMENTS

| | | |
|---|---|---|
| CN | 105580457 | 5/2016 |
| EP | 3010268 | 4/2016 |
| JP | 2009010509 | 1/2009 |
| JP | 2015002403 | 1/2015 |
| KR | 1020120117726 | 10/2012 |
| WO | 2016048096 | 3/2016 |

OTHER PUBLICATIONS

Mediatek et al., "WF on OTA signaling for dynamic TDD in NR," 3GPP TSG-RAN WG1 Meeting #87, R1-1613319, Nov. 2016, 3 pages.

Korean Intellectual Property Office Application Serial No. 10-2019-7020668, Office Action dated Sep. 21, 2022, 4 pages.

1 European Patent Office Application Serial No. 18736253.8, Office Action dated Feb. 4, 2022, 12 pages.

The State Intellectual Property Office of the People's Republic of China Application Serial No. 201880016817.4, Office Action dated Jun. 3, 2020, 7 pages.

PCT International Application No. PCT/KR2018/000201, Written Opinion of the International Searching Authority dated Apr. 25, 2018, 26 pages.

Huawei, et al., "Discussion on TRP-to-TRP interference mitigation schemes", 3GPP TSG RAN WG1 Meeting #86bis, R1-1608830, Oct. 2016 4 pages.

Huawei, et al., "Timing Alignment on Cross-link for Flexible Duplex", 3GPP TSG RAN WG1 Meeting #87, R1-1611227, Nov. 2016, 5 pages.

European Patent Office Application Serial No. 18736253.8, Search Report dated Oct. 19, 2020, 15pages.

Intel Corporation, "Discussion on inter-cell measurement for LTE-TDD eIMTA," 3GPP TSG RAN WG1 Meeting #72bis, R1-131471, Apr. 2013, 5 pages.

\* cited by examiner

METHOD FOR CONTROLLING CROSS-LINK INTERFERENCE, AND APPARATUS THEREFOR

CROSS-REFERENCE TO RELATED APPLICATIONS

This application is a continuation of U.S. patent application Ser. No. 16/476,520, filed on Jul. 8, 2019, which is the National Stage filing under 35 U.S.C. 371 of International Application No. PCT/KR2018/000201, filed on Jan. 4, 2018, which claims the benefit of U.S. Provisional Application No. 62/443,773, filed on Jan. 8, 2017, the contents of which are all hereby incorporated by reference herein in their entirety.

TECHNICAL FIELD

The present invention relates to wireless communication, and more particularly, to a method of controlling cross-link interference and apparatus therefor.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place using the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

DISCLOSURE OF THE INVENTION

Technical Task

One technical task of the present invention is to provide a method of controlling crosslink interference by a TRP.

Another technical task of the present invention is to provide a TRP device for controlling crosslink interference.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present invention, provided herein is a method of controlling crosslink interference by a Transmission and Reception Point (TRP), the method including determining a Timing Advance (TA) value for measuring or cancelling the crosslink interference if an interval, which the crosslink interference between the TRP and at least one adjacent TRP occurs on, is configured in a prescribed subframe and transmitting the determined TA value in the prescribed subframe to a user equipment, wherein the interval, which the crosslink interference occurs on, is set as an uplink reception interval for the TRP and a downlink transmission interval for the at least one adjacent TRP.

The method may further include measuring the crosslink interference, and the TA value may be determined based on the measurement.

The determined TA value may be a value for adjusting a timing of the uplink reception interval of the TRP so that the crosslink interference is received within a Cyclic Prefix (CP) length. Or, the determined TA value may be a value for adjusting a boundary of the prescribed subframe of the at least one adjacent TRP so that the crosslink interference is received within a Cyclic Prefix (CP) length.

The method may further include receiving a signal in an uplink reception interval adjusted according to the determined TA value from the user equipment. The method may further include receiving downlink/uplink configuration information to be used to estimate the crosslink interference from the at least one TRP and estimating a presence or non-presence of an occurrence of the crosslink interference based on the downlink/uplink configuration information of the at least one TRP. If the determined TA value is transmitted to the user equipment, information indicating that the determined TA value is a TA value for measurement or cancellation of the crosslink interference may be further transmitted.

In another technical aspect of the present invention, provided herein is a Transmission and Reception Point (TRP) for controlling crosslink interference, the TRP including a processor configured to determine a Timing Advance (TA) value for measuring or cancelling the crosslink interference if an interval, which the crosslink interference between the TRP and at least one adjacent TRP occurs on, is configured in a prescribed subframe and a transmitter configured to transmit the determined TA value in the prescribed subframe to a user equipment, wherein the interval, which the crosslink interference occurs on, is set as an uplink reception interval for the TRP and a downlink transmission interval for the at least one adjacent TRP.

The processor may be configured to measure the crosslink interference and determine the TA value based on the measurement. The processor may determine the TA value as a value for adjusting a timing of the uplink reception interval of the TRP so that the crosslink interference is received within a Cyclic Prefix (CP) length. The processor may determine the TA value as a value for adjusting a boundary of the prescribed subframe of the at least one adjacent TRP so that the crosslink interference is received within a Cyclic Prefix (CP) length.

The TRP may further include a receiver configured to receive a signal in an uplink reception interval adjusted according to the determined TA value from the user equipment.

If the determined TA value is transmitted to the user equipment, the transmitter may further transmit information indicating that the determined TA value is a TA value for measurement or cancellation of the crosslink interference.

The TRP may further include a receiver configured to receive downlink/uplink configuration information to be used to estimate the crosslink interference from the at least one TRP, and the processor may be configured to estimate a presence or non-presence of an occurrence of the crosslink interference based on the downlink/uplink configuration information of the at least one TRP.

Advantageous Effects

The present invention is in the intermediate stage of a realistic evolution direction of FDR technology and improves communication performance by mitigating or resolving the crosslink interference in the flexible duplex wireless transmission type of assigning the previously assigned DL or UL band to UL or DL that is a different duplex.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

BEST MODE FOR INVENTION

Figure 1:
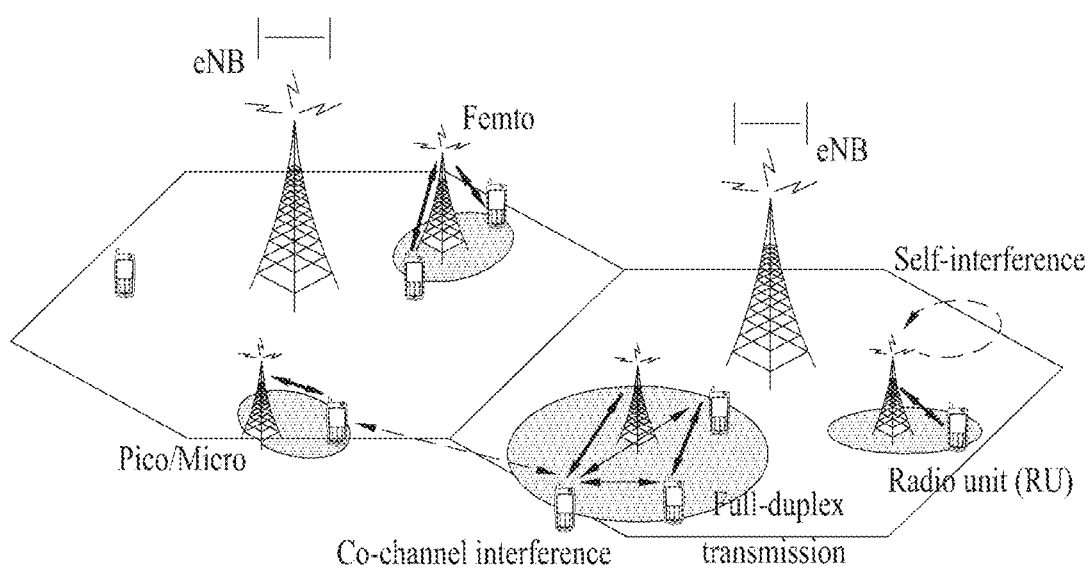
FIG. 1 is a view exemplarily illustrating a network supporting a full/half duplex communication operation mode of a UE according to the present invention.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

Figure 2:
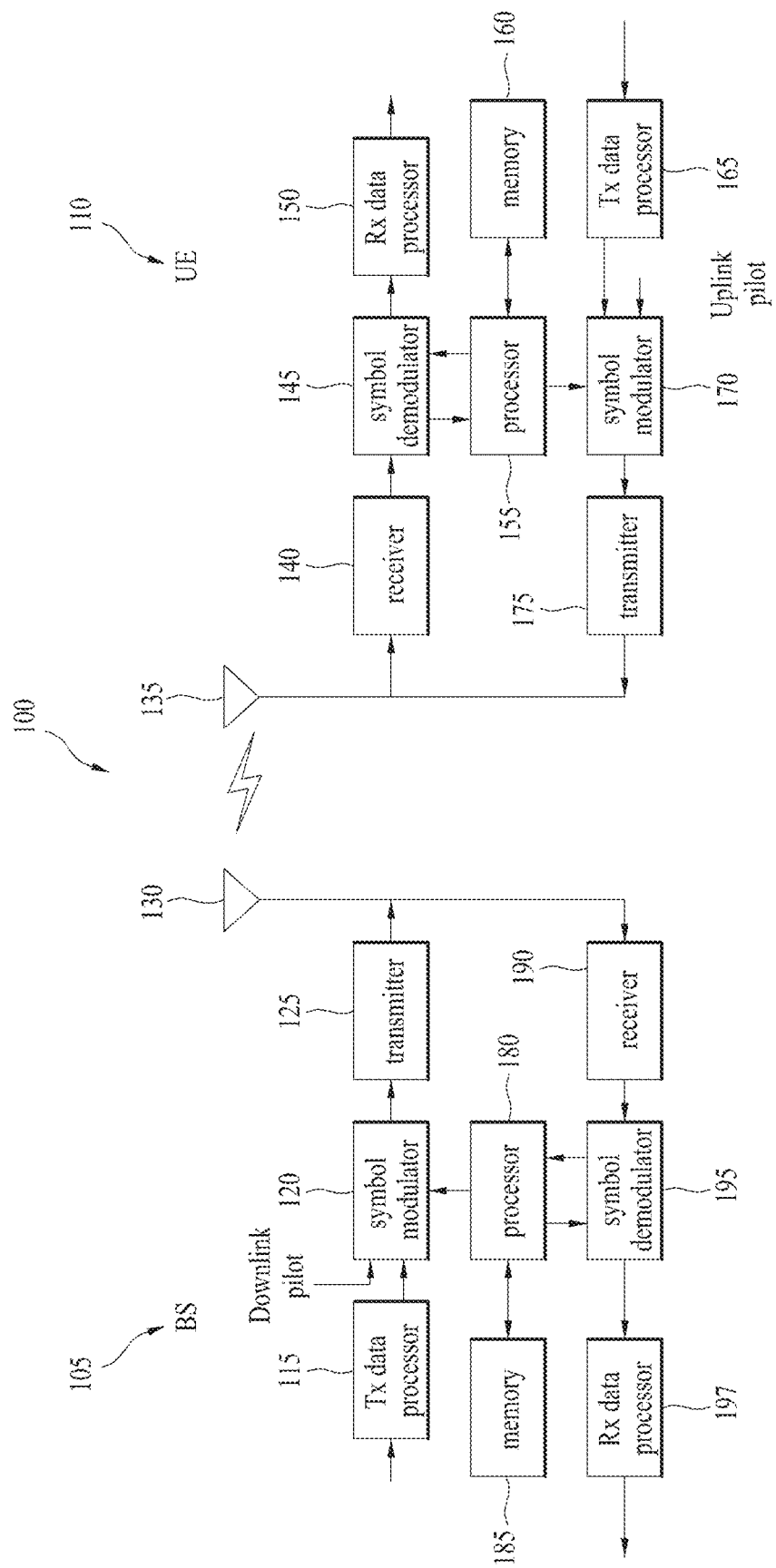
FIG. 2 is a block diagram for configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data.

The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
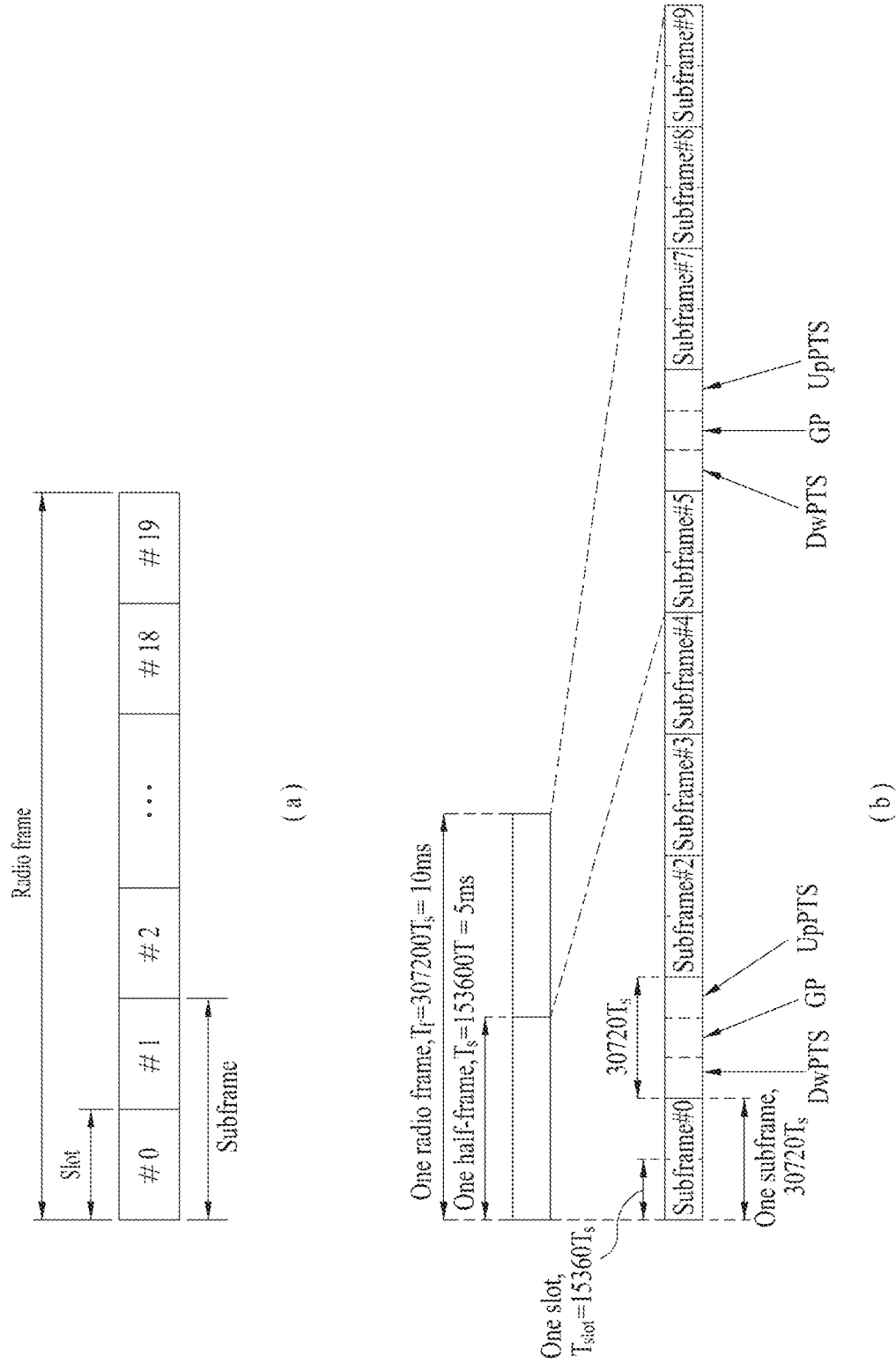
FIG. 3 is a diagram illustrating exemplary radio frame structures used in 3GPP LTE/LTE-A system, which is an example of a wireless communication system.

FIG. 3 illustrates exemplary radio frame structures used in 3GPP LTE/LTE-A system, which is an example of a wireless communication system.

Regarding the usual representation of wireless transmission, when wireless transmission is performed between a base station and a wireless UE as wireless devices, a transmission from the base station to the wireless UE and a transmission from the wireless UE to the base station are commonly named a downlink (DL) transmission and an uplink (UL) transmission, respectively. a way of distinguishing radio resources between the downlink transmission and the uplink transmission is defined as duplex. A case of bidirectional transmission/reception by dividing a frequency band into a downlink transmission band and an uplink transmission band is represented as Frequency Division Duplex (FDD). And, a case of transmission/reception on the same frequency band by dividing a time domain radio resource into a downlink time duration resource and an uplink time duration resource is represented as Time Division Duplex (TDD).

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 3(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 3(*b*) illustrates the type-2 radio frame structure.

A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal.

Each half frame includes 5 subframes. A subframe denoted by 'D' is a subframe for a DL transmission, a subframe denoted by 'U' is a subframe for a UL transmission, a subframe denoted by 'S' is a special subframe including a downlink pilot time slot (DwPTS), a guard period (GP) and an uplink pilot time slot (UpPTS). The DwPTS is used for an initial cell search, a synchronization or a channel estimation in a user equipment. The UpPTS is used for a channel estimation in a base station and an uplink transmission synchronization of a user equipment. The guard period is a period for removing interference generated from an uplink due to a multipath delay of a DL signal between the uplink and the downlink.

In case of 5 ms DL-UL switch-point period, a special subframe S exists in every half frame. In case of 5 ms DL-UL switch-point period, it exists in a $1^{st}$ half frame only. Subframe indexes 0 and 5 (subframe 0 and subframe 5) and DwPTS correspond to the interval for a DL transmission only. The UpPTS and a subframe right contiguous with the special subframe always correspond to an interval for a UL transmission. If multi-cells are aggregated, a user equipment can assume the same UL-DL configuration across all cells. And, guard periods of special subframes in different cells overlap each other by 1456 Ts at least. The above-described structures of the radio frame are just exemplary. And, the number of subframes included in a radio frame, the number of slots included in the subframe and the number of symbols included in the slot may be modified in various ways.

Table 1 in the following indicates a configuration (length of DwPTS/GP/UpPTS) of a special frame.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows UL-DL configuration in the type-2 frame structure of 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in the 3GPP LTE system, there are 7 types of UL-DL configurations in the type-2 frame structure. The respective configurations may differ from each other in the numbers or locations of DL subframes, special subframes and UL subframes. In the following description, various embodiments of the present invention shall be explained based on the UL-DL configurations of the type-2 frame structure shown in Table 2. Table 3 shows k values for TDD configurations 0 to 6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | 4 | | | | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

In the type-1 frame structure, HARQ-ACK received on PHICH assigned to a UE in subframe i is related to PUSCH transmission in subframe i-4. In the UL/DL configurations 1 to 6 of the type-2 frame structure, HARQ-ACK received on PHICH assigned to a UE in subframe i is related to PUSCH transmission in subframe i-k (k is shown in Table 3).

A UE HARQ-ACK procedure in 3GPP LTE/LTE-A system is schematically described as follows. The present invention shall be described based on the UE HARQ-ACK procedure in 3GPP LTE/LTE-A system.

TABLE 4

For Frame Structure type 2 UL/DL configuration 1-6, an HARQ-ACK received on the
PHICH assigned to a UE in subframe i is associated with the PUSCH transmission in the
subframe i-k as indicated by the table 3.
For Frame Structure type 2 UL/DL configuration 0, an HARQ-ACK received on the
PHICH in the resource corresponding to $I_{PHICH} = 0$, assigned to a UE in subframe i is associated
with the PUSCH transmission in the subframe i-k as indicated by the table 3. If, for Frame
Structure type 2 UL/DL configuration 0, an HARQ-ACK received on the PHICH in the
resource corresponding to $I_{PHICH} = 1$, assigned to a UE in subframe i is associated with the
PUSCH transmission in the subframe i-6.
The physical layer in the UE shall deliver indications to the higher layers as follows:
For downlink subframe i, if a transport block was transmitted in the associated
PUSCH subframe then:
if ACK is decoded on the PHICH corresponding to the transport block in subframe i,
ACK for that transport block shall be delivered to the higher layers;
else NACK for that transport block shall be delivered to the higher layers.
For downlink subframe i, in case of a retransmission in the associated PUSCH
subframe, if a transport block was disabled in the associated PUSCH subframe then ACK for
that transport block shall be delivered to the higher layers.

A PHICH assignment procedure in 3GPP LTE/LTE-A system is schematically described as follows. The present invention shall be described based on the PHCI assignment procedure in 3GPP LTE/LTE-A system.

TABLE 5

For PUSCH transmissions scheduled from serving cell in subframe n, a UE shall determine the
corresponding PHICH resource of serving cell c in subframe $n + k_{PHICH}$, where $k_{PHICH}$ is always
4 for FDD and is given in following table 6 for TDD. For subframe bundling operation, the
corresponding PHICH resource is associated with the last subframe in the bundle.
The PHICH resource is identified by the index pair $(n_{PHICH}^{group}, n_{PHICH}^{seq})$ where $n_{PHICH}^{group}$ is the
PHICH group number and $n_{PHICH}^{seq}$ is the orthogonal sequence index within the group as defined by:
$n_{PHICH}^{group} = (I_{PRB\_RA} + n_{DMRS}) \bmod N_{PHICH}^{group} + I_{PHICH} N_{PHICH}^{group}$
$n_{PHICH}^{seq} = (\lfloor I_{PRB\_RA}/N_{PHICH}^{group} \rfloor + n_{DMRS}) \bmod 2N_{SF}^{PHICH}$
where
$n_{DMRS}$ is mapped from the cyclic shift for DMRS field (according to following table 6) in the
most recent PDCCH with uplink DCI format [4] for the transport block(s) associated with the
corresponding PUSCH transmission. $n_{DMRS}$ shall be set to zero, if there is no PDCCH with
uplink DCI format for the same transport block, and
if the initial PUSCH for the same transport block is semi-persistently scheduled, or
if the initial PUSCH for the same transport block is scheduled by the random access response grant.
$N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first TB of a PUSCH with associated PDCCH or for the case of no associated PDCCH when the number of negatively acknowledged TBs is not equal to the number of TBs indicated in the most recent PDCCH associated with the corresponding PUSCH} \\ I_{PRB\_RA}^{lowest\_index} + 1 & \text{for a second TB of a PUSCH with associated PDCCH} \end{cases}$$

where $I_{PRB\_RA}^{lowest\_index}$ is the lowest PRB index in the first slot of the corresponding PUSCH
transmission
$N_{PHICH}^{group}$ is the number of PHICH groups configured by higher layers as described in section 6.9 of
[3], $$I_{PHICH} = \begin{cases} 1 & \text{for TDD UL/DL configuration 0 with PUSCH transmission in subframe } n = 4 \text{ or } 9 \\ 0 & \text{otherwise} \end{cases}$$

TABLE 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |

TABLE 6-continued

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 4 | | | | 6 | 6 | | | | | |
| 5 | | | | 6 | | | | | | |
| 6 | | | | 4 | 6 | 6 | | | 4 | 7 |

Figure 4:
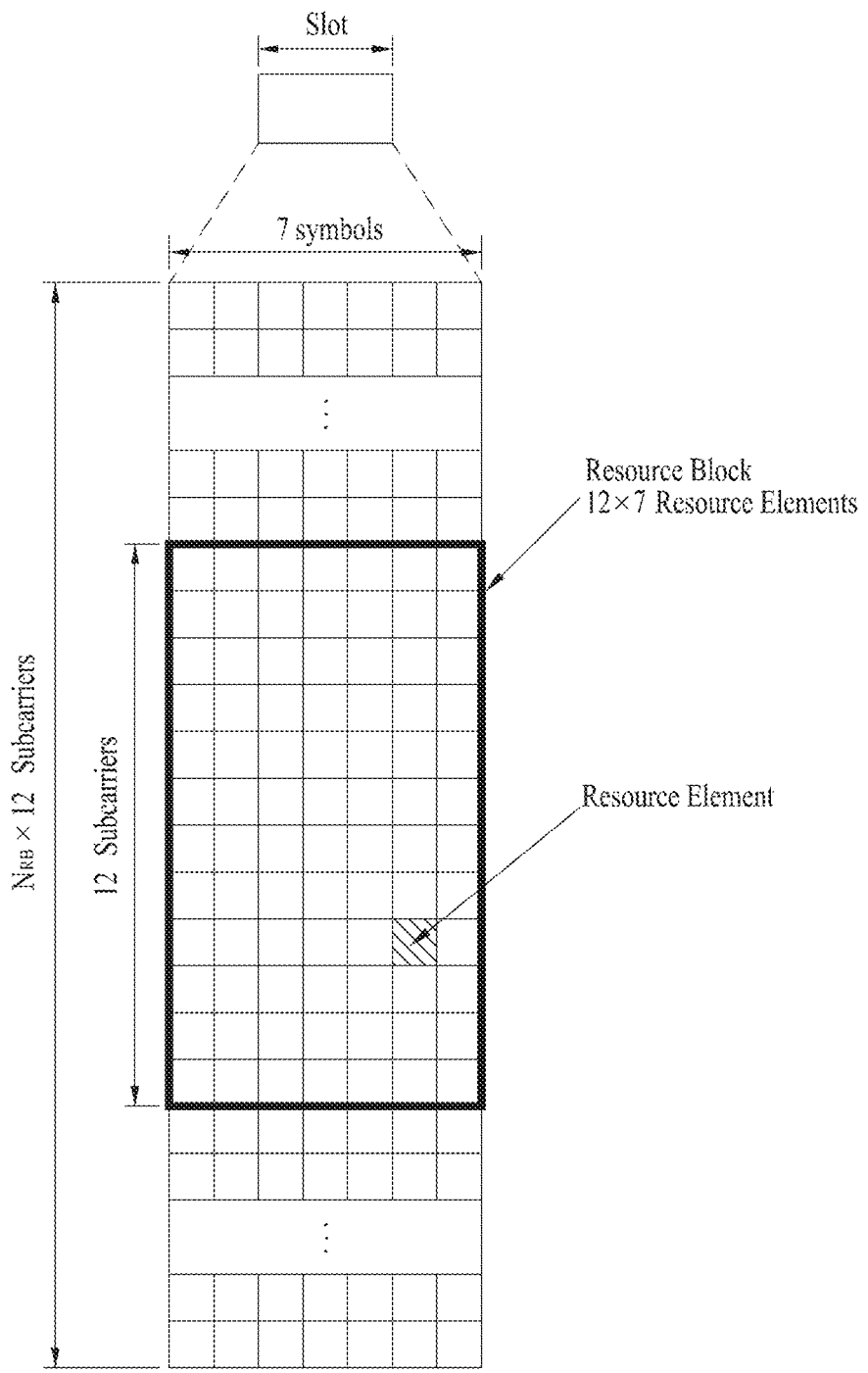
FIG. 4 is a diagram illustrating an exemplary resource grid for the duration of a downlink slot used in 3GPP LTE/LTE-A system, which is an example of a wireless communication system.

FIG. 4 is a diagram illustrating an exemplary resource grid for the duration of a downlink slot used in 3GPP LTE/LTE-A system, which is an example of a wireless communication system;

Referring to FIG. 4, a DL slot includes a plurality of OFDM symbols in a time domain. One DL slot includes 7 (or 6) OFDM symbols and a resource block may include 12 subcarriers in a frequency domain. Each element on a resource grid is called a resource element (RE). One RB includes 12×7 or 12×6 REs. The number Nan of RBs included in the DL slot depends on a DL transmission band. A structure of a UL slot is identical to that of the DL slot but OFDM symbol is replaced by SC-FDMA symbol.

Figure 5:
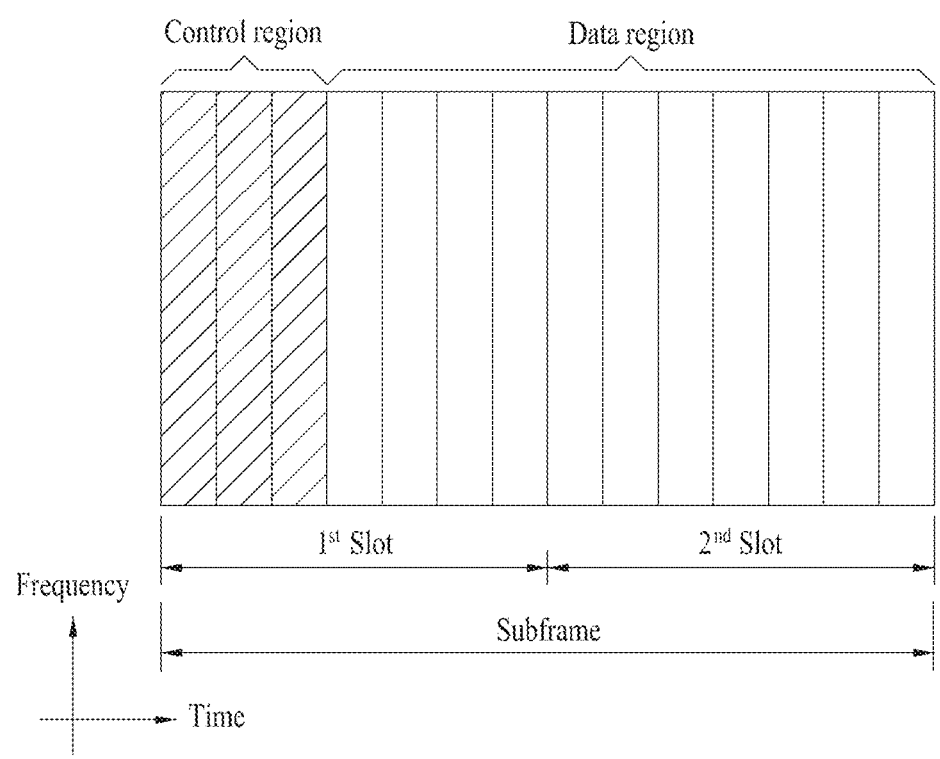
FIG. 5 is a diagram illustrating an exemplary structure of an downlink subframe used in 3GPP LTE/LTE-A system, which is an example of a wireless communication system.

FIG. 5 is a diagram illustrating an exemplary structure of an downlink subframe used in 3GPP LTE/LTE-A system, which is an example of a wireless communication system;

Referring to FIG. 5, up to three(four) OFDM symbols at the start of the first slot in a downlink subframe are used for a control region to which control channels are allocated and the other OFDM symbols of the downlink subframe are used for a data region to which a PDSCH is allocated. Downlink control channels used in the LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission.

Control information transmitted on PDCCH is called DCI (downlink control information). Regarding DCI formats, Format 0 is defined for uplink and Format 1, Format 1A, Format 1B, Format 1C, Format 1D, Format 2, Format 2A, Format 3, Format 3A and the like are defined for downlink. Depending on usages, DCI format selectively includes such information as hopping flag, RB assignment, MCS (modulation coding scheme), RV (redundancy version), NDI (new data indicator), TPC (transmit power control), cyclic shift DM RS (demodulation reference signal), CQI (channel quality information) request, HARQ process number, TPMI (transmitted precoding matrix indicator), PMI (precoding matrix indicator) confirmation and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

Figure 6:
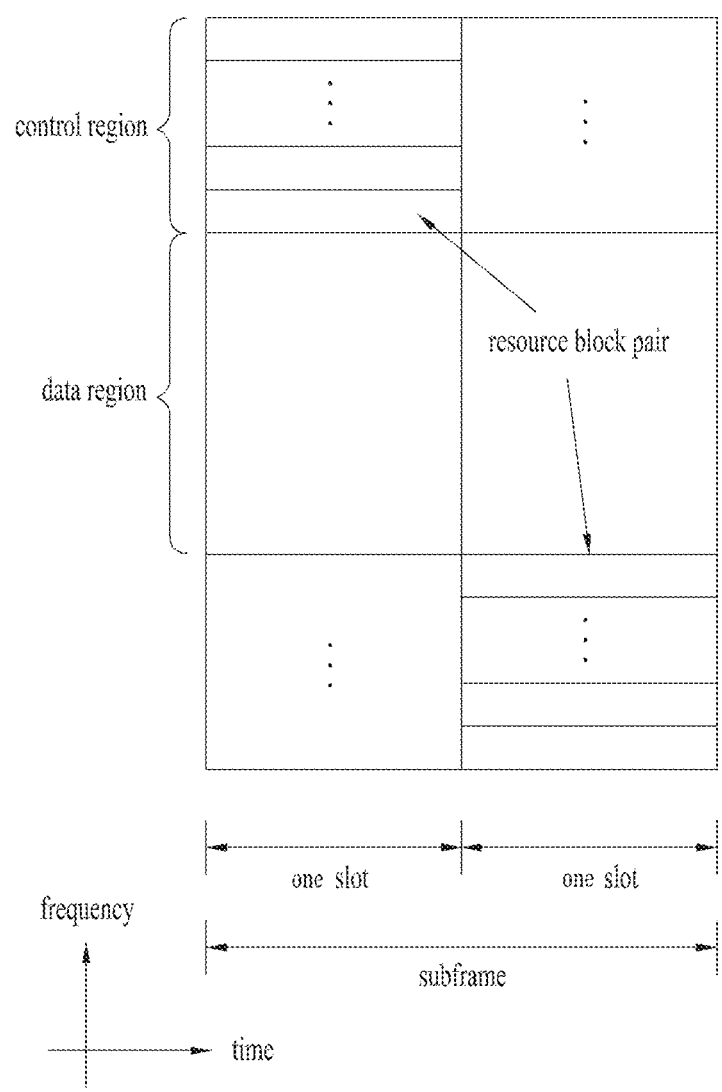
FIG. 6 is a diagram illustrating an exemplary structure of a uplink subframe used in 3GPP LTE/LTE-A system, which is an example of a wireless communication system.

FIG. 6 is a diagram illustrating an exemplary structure of a uplink subframe used in 3GPP LTE/LTE-A system, which is an example of a wireless communication system.

Referring to FIG. 6, a UL subframe includes a plurality of slots (e.g., 2 slots). Each of the slots can include SC-FDMA symbols of which number varies in accordance with a CP length. The UL subframe is divided into a data region and a control region in a frequency domain. The data region includes PUSCH and is used to transmit such a data signal as audio and the like. The control region includes PUCCH and is used to transmit uplink control information (UCI). The PUCCH includes an RB pair situated at both end portions of the data region on a frequency axis and hops using a slot as a boundary.

PUCCH can be used to transmit the following control information.

SR (scheduling request): this is information used to request an uplink UL-SCH resource. This is transmitted by OOK (on-off keying).

HARQ ACK/NACK: This is a response signal for a DL data packet on PDSCH. This indicates whether the DL data packet is successfully received. In response to a single DL codeword, 1-bit ACK/NACK is transmitted. In response to two DL codewords, 2-bit ACK-NACK is transmitted.

CQI (channel quality indicator): This is the feedback information on a DL channel. MIMO (multiple input multiple output) related feedback information includes RI (rank indicator), PMI (precoding matrix indicator), PTI (precoding type indicator) and the like. 20 bits are used per subframe.

A size of control information (UCI) transmittable in a subframe by a user equipment depends on the number of SC-FDMAs available for a control information transmission. The SC-FDMA available for the control information transmission means SC-FDMA symbol remaining after excluding SC-FDMA symbol for a reference signal transmission from a subframe. In case of an SRS (sounding reference signal) configured subframe, a last SC-FDMA symbol of the subframe is excluded as well. A reference signal is used for coherent detection of PUCCH. And, the PUCCH supports 7 formats depending on transmitted informations.

Since an FDR transceiving system capable of transmitting and receiving a UL signal and a DL signal on the same frequency band simultaneously can double frequency efficiency (spectral efficiency) to the maximum in comparison with an existing system that transmits and receives a UL signal and a DL signal by dividing frequency or time, it is getting the spotlight as one of the core technologies of the next generation 5G mobile communication system.

FDR using a single frequency transmission band can be defined as a transmission resource configuration scheme of simultaneously performing transmission and reception through a single frequency transmission band in aspect of a random wireless device. As one special example of this, it can be represented as a transmission resource configuration scheme of simultaneously performing 'DL transmission and UL reception of a base station' and 'DL reception and UL transmission of a wireless UE' through a single frequency transmission band regarding the wireless communication between a general base station (or, relay, relay node, Remote Radio Head (RRH), etc.) and a wireless UE. As another example, it can be represented as a transmission resource configuration scheme of simultaneously performing transmissions and receptions between wireless UEs on the same frequency transmission band in a situation of device-to-device direct communication (D2D) between wireless UEs. Although proposed technologies related to FDR are described in this disclosure by exampling a case of wireless transmission/reception between a general base station and a wireless UE, the present invention includes a case of a network wireless device performing wireless transmission/reception with a UE as well as a general base station and also includes a case of direct communication between UEs.

Figure 7:
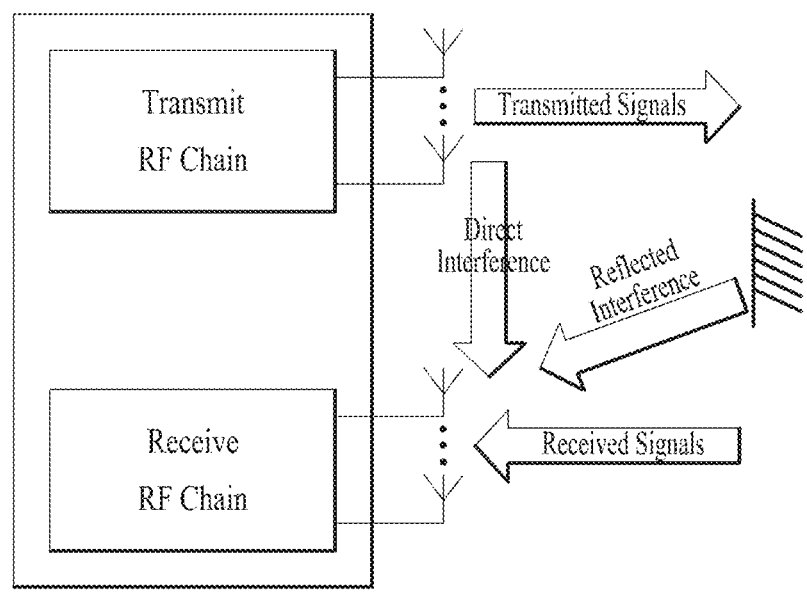
FIG. 7 is a diagram showing the concept of a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 7 below.

TABLE 7

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 7, it may be noted that to effectively operate the FDR system in a 20-MHz BW, a UE needs 119-dBm Self-IC performance. A thermal noise value may be changed to $N_{0,BW}=-174$ dBm+$10\times\log_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
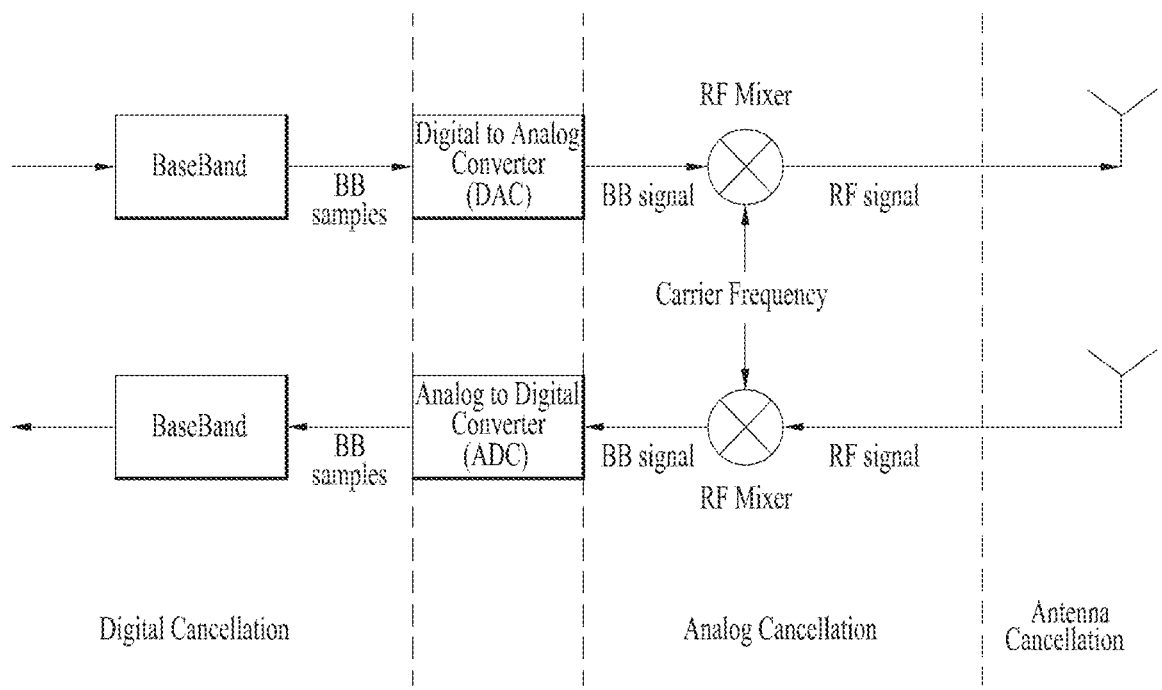
FIG. 8 is a view illustrating positions at which three Self-IC schemes are applied, in a Radio Frequency (RF) Tx and Rx end (or an RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
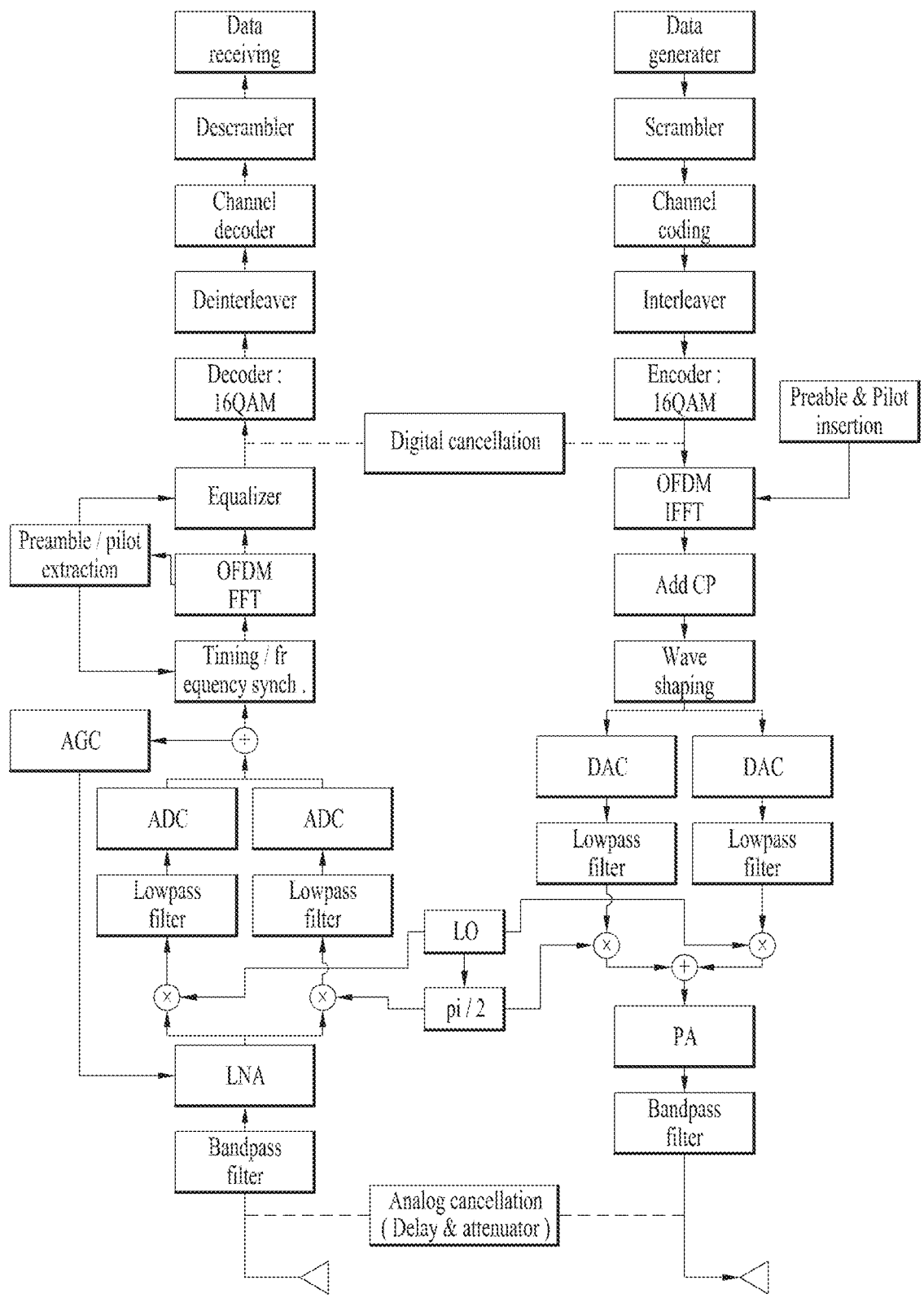
FIG. 9 is a block diagram of a Self-IC device in a proposed communication apparatus in an OFDM communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 9.

3GPP LTE system operates based on fixed UL and DL bands for which both TDD and FDD are determined in advance like Table 8. In case of TDD, TDD configuration can be determined cell-specifically. Yet, in case of FDD, determined UL and DL bands are located on different frequency bands, respectively. Since one band is determined to be utilized for the usage of either UE transmission or base station transmission, transmission on other bands cannot be performed. Table 8 shows E-UTRA frequency bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 24 | 1626.5 MHz-1660.5 MHz | 1525 MHz-1559 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note 1:
Band 6 is not applicable.

Yet, an actual data situation of a UE has the characteristic of asymmetric data traffic. In most of communication environments, DL data traffic is heavier than UL data traffic. And, a traffic amount of about 1:9 between UL and DL has been reported. In such an asymmetric data traffic situation, in case of operating by FDD-LTE on the basis of frequency assignment for the fixed UL and DL transmissions like Table 8, resource utilization may be lowered. To solve such a problem, Flexible FDD wireless transmission scheme was proposed as an early stage of the FDR system.

Flexible FDD system is the technology intending to raise resource use efficiency in accordance with a traffic situation of a UE in a manner of utilizing a UL band as a DL band for a specific time based on a fact that an operation of FDD system is deregulated according to the actual asymmetric data traffic characteristic. The resource use efficiency comparison between the existing FDD-LTE and the flexible FDD wireless transmission scheme is shown in FIG. 10.

Figure 10:
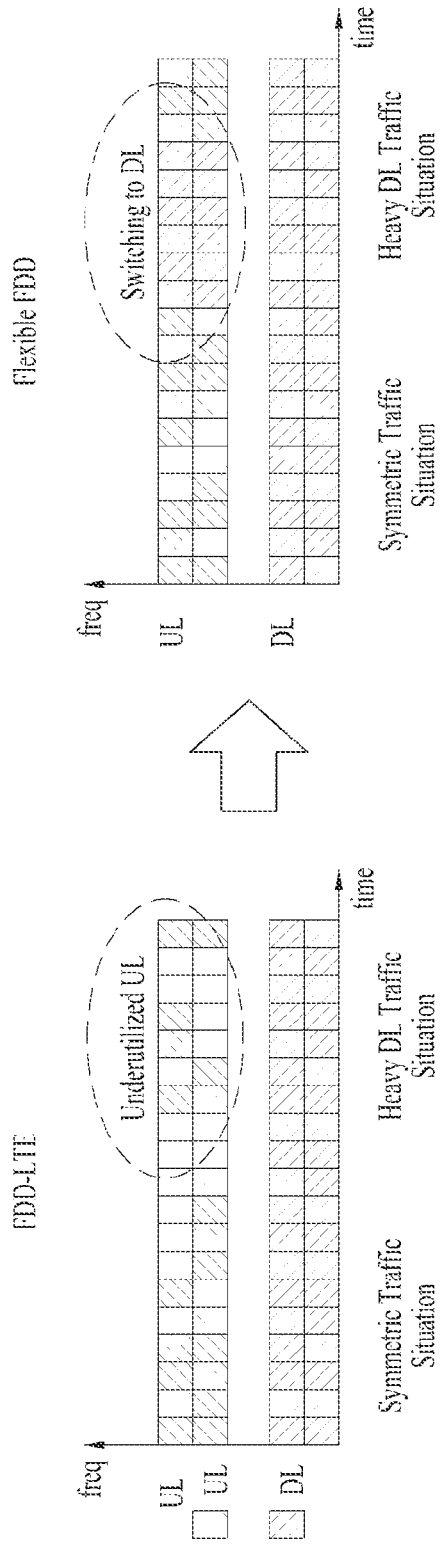
FIG. 10 is a diagram showing the resource use efficiency comparison between the existing FDD-LTE and the flexible FDD wireless transmission scheme (Symmetric traffic situation and heavy DL data traffic situation).

FIG. 10 is a diagram showing the resource use efficiency comparison between the existing FDD-LTE and the flexible FDD wireless transmission scheme (Symmetric traffic situation and heavy DL data traffic situation).

Referring to FIG. 10, as DL and UL resources are mostly used in a symmetric data traffic situation, resource efficiency is high. Yet, in a heavy DL data traffic situation, as resources are not used in case of FDD (FDD-LTE) in an existing LTE system, FIG. 10 clearly shows that frequency resource is wasted. Thus, in order to solve the problem that resource use efficiency is lowered, by utilizing a UL frequency resource as a frequency resource for DL transmission at a specific time, resource efficiency can be raised in a heavy DL data traffic situation. This is shown in detail in FIG. 11 together with a buffer status to transmit in a flexible FDD wireless transmission scheme.

Figure 11:
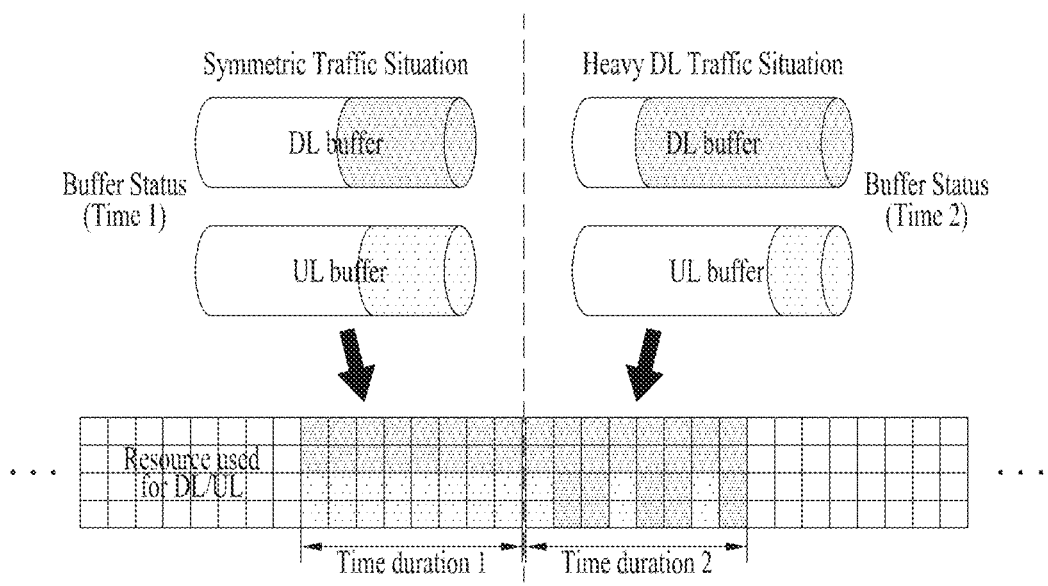
FIG. 11 is a diagram showing resource utilization in flexible FDD.

FIG. 11 is a diagram showing resource utilization in flexible FDD.

Compared to a resource use in case of a symmetric traffic situation, resource efficiency can be raised in a heavy DL traffic situation by utilizing a UL frequency resource as a DL resource for a DL transmission at a specific time.

Referring to FIG. 11, a flexible FDD wireless transmission scheme means a scheme of flexibly configuring a DL frequency resource and a UL frequency resource to be suitable for each service or application program. In this case, a time resource may be configured by a unit such as a time slot configured with one or more transmission symbols, a subframe, a frame or the like. Through this, a wireless transmission resource allocation optimized for a service or application characteristic of an individual wireless UE unit can be supported and the overall frequency use efficiency on the random base station coverage can be advantageously increased as well.

Figure 12:
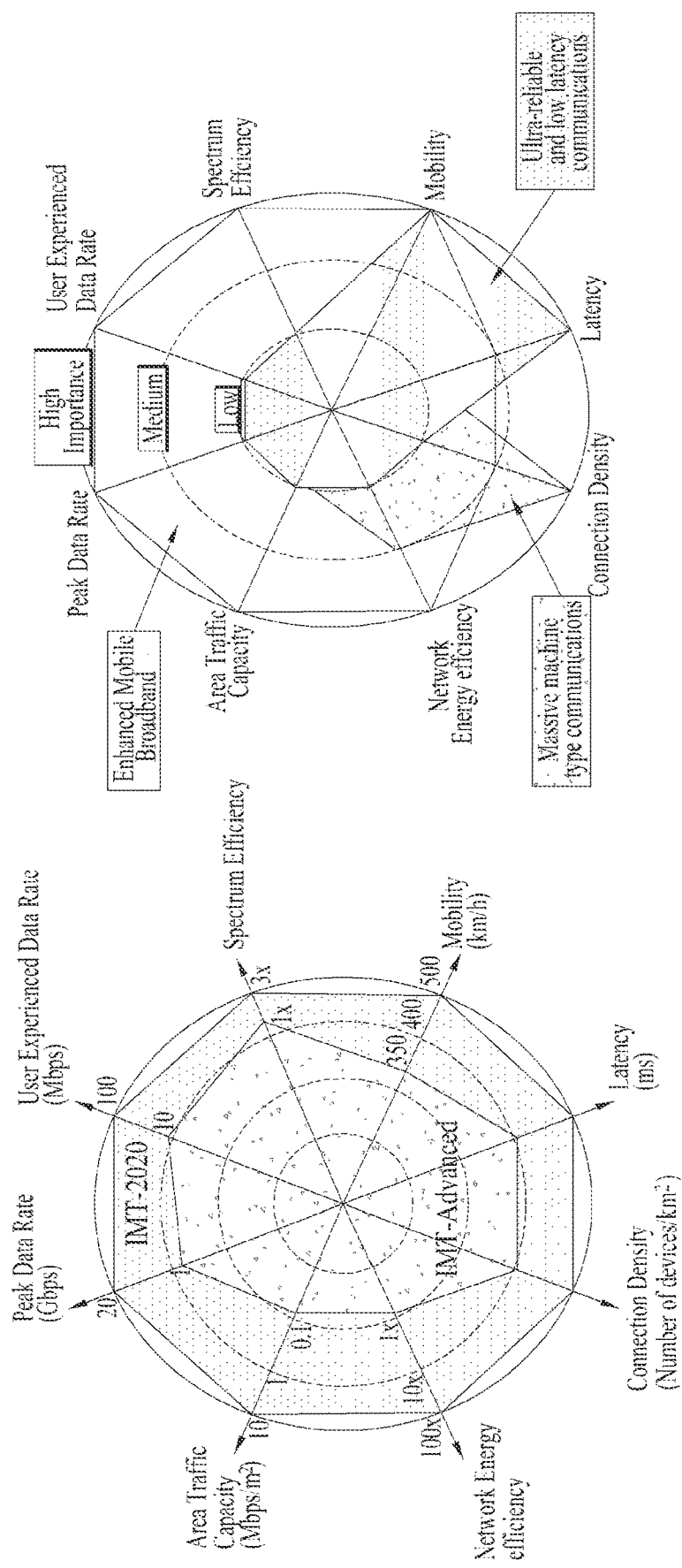
FIG. 12 is a diagram for explaining relation between IMT 2020 core performance requirements for 5G and 5G performance requirements for each service scenario.

FIG. 12 is a diagram for explaining relation between IMT 2020 core performance requirements for 5G and 5G performance requirements for each service scenario.

FIG. 12 illustrates the relation between the core performance requirements for 5G, which are proposed in IMT 2020, and the 5G performance requirements for each service scenario.

In particular, uMTC services have extremely restricted Over-The-Air (OTA) latency requirements and requires high mobility and reliability (OTA Latency: <1 ms, Mobility: >500 km/h, and BLER: $<10^{-6}$).

Figure 13:
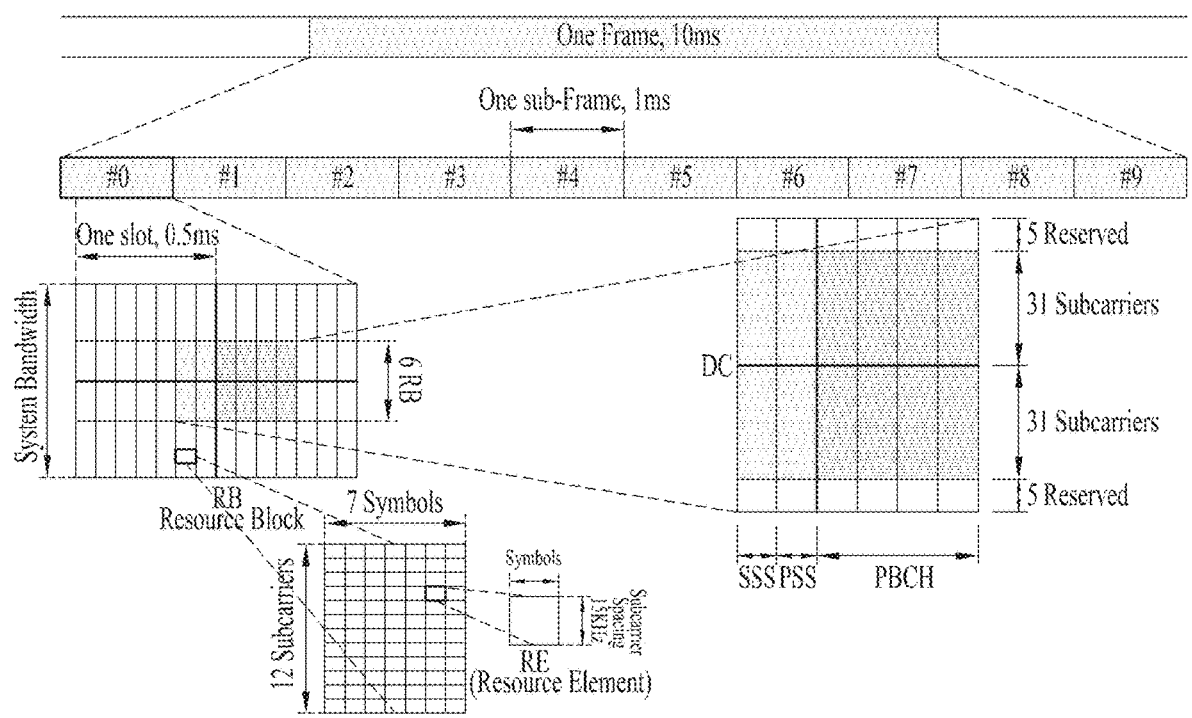
FIG. 13 is a diagram showing the LTE/LTE-A frame structure.

FIG. 13 is a diagram showing the LTE/LTE-A frame structure.

FIG. 13 shows the basic concept of the frame structure of LTE/LTE-A. One fame amounts to 10 ms and includes 10 subframes of 1 ms. One subframe includes 2 slots of 0.5 ms, and one slot includes 7 OFDM (Orthogonal Frequency Division Multiplexing) symbols. One Resource Block (RB) is defined with 12 subcarriers in interval of 15 kHz and 7 OFDM symbols. On the center frequency 6 RBs, a base station transmits Primary Synchronization Signal (PSS) for synchronization, Secondary Synchronization Signal (SSS), and Physical Broadcast Channel (PBCH) for system information. Here, according to Normal/Extended CP (Cyclic Prefix), TDD (Time Division Duplex)/FDD (Frequency Division Duplex), the frame structure, a signal and a channel positions may vary.

Figure 14:
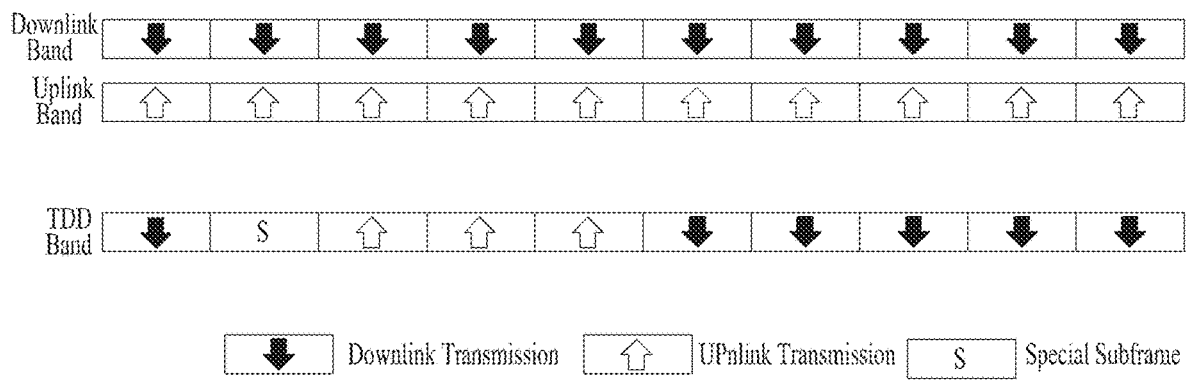
FIG. 14 is a diagram showing an example of FDD/TDD frame structure in LTE/LTE-A system

FIG. 14 is a diagram showing an example of FDD/TDD frame structure in LTE/LTE-A system.

Referring to FIG. 14, in case of an FDD frame structure, DL and UL frequency bands are distinct from each other. In case of a TDD frame structure, a DL region and a UL region are distinct from each other within the same band in unit of a subframe.

Figure 15:
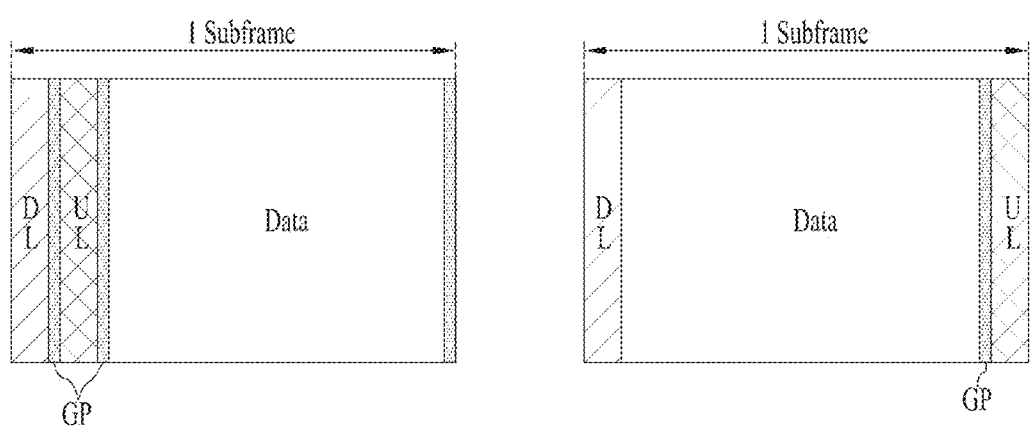
FIG. 15 is a diagram showing an example of a self-contained subframe structure.

FIG. 15 is a diagram showing an example of a self-contained subframe structure.

FIG. 15 shows a self-contained subframe structure to meet a low delay requirement among 5G performance requirements. Regarding a TDD based self-contained subframe structure, resource intervals (e.g., DL control channel and a UL control channel) for DL and UL exits within a single subframe. And, a Guard Period (GP) for solving a problem of interference between DL and UL and a resource interval exist as well.

FIG. 15 (a) shows one example of a self-contained subframe structure. A subframe is configured in order of resource intervals for DL-UL-data and each GP exists between the resource intervals. In FIG. 15 (a), a DL resource interval denoted by DL may be a resource interval for a DL control channel and a UL resource interval denoted by UL may be a resource interval for a UL control channel.

FIG. 15 (b) shows one example of a self-contained subframe structure. A subframe is configured in order of resource intervals for DL-data-UL and a GP exists in front of the UL resource interval only. Likewise, in FIG. 15 (b), a DL resource interval denoted by DL may be a resource interval for a DL control channel and a UL resource interval denoted by UL may be a resource interval for a UL control channel.

Figure 16:
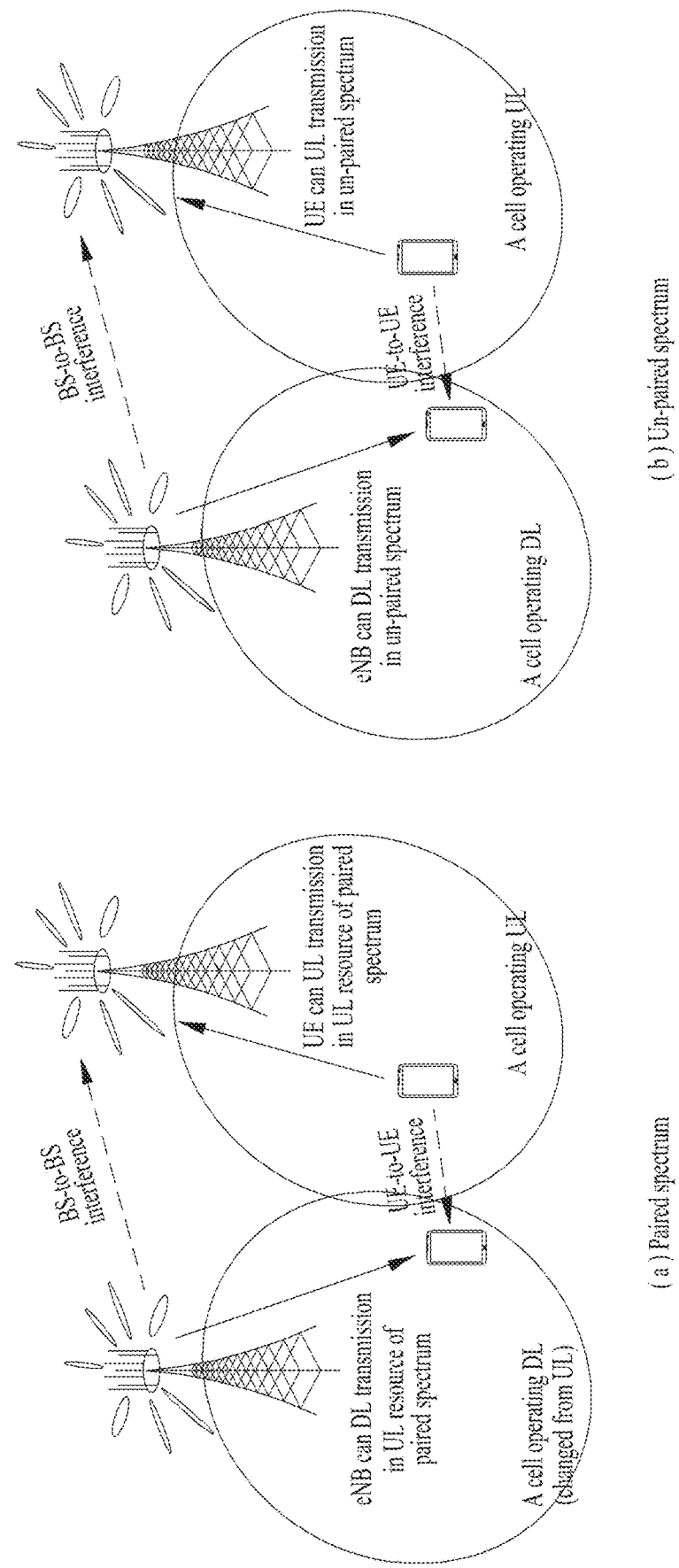
FIG. 16 is a diagram showing an example of the crosslink interference for a TDM flexible duplex operation in a paired/unpaired spectrum.

FIG. 16 is a diagram showing an example of the crosslink interference for a TDM flexible duplex operation in a paired/unpaired spectrum.

Interference supposed to be additionally considered in operating flexible duplex shall be named 'crosslink interference' in the following. Particularly, as an adjacent base station performs a DL/UL operation in a different direction, a DL signal generation of the adjacent base station works as interference on a UL reception of a specific base station. Moreover, a UL signal generation of an adjacent UE works as interference on a DL reception of a specific UE. Such crosslink interference is well shown in FIG. 16 according to a paired spectrum and an unpaired spectrum.

The present invention proposes technologies to effectively apply a flexible duplex wireless transmission scheme to a wireless transmission between a base station and a UE. The technology of the present invention is applicable to a case of sharing resources as well as to flexible duplex. Such an example is usable for a case that DL and UL share a resource in an unpaired spectrum, a case that DL and UL share a resource on a single band in a paired spectrum, a case that DL/UL and a sidelink (SL) share a resource, a case that a backhaul and an access link share a resource, and the like. A base station disclosed in the present invention may include a relay, a relay node, a Remote Radio Head (RRH), a Transmission and Reception Point (TRP), etc. The present invention intends to propose a timing scheme for measuring crosslink interference generated from a flexible duplex wireless transmission scheme, a procedure for supporting the same, and one example of signaling. In viewpoint of a base station, an example of the crosslink interference shown in FIG. 16 is illustrated again in FIG. 17.

The present invention explains the proposals and then describes the detailed embodiments of the proposals. The proposals and the embodiments of the proposals may be usable in a manner of being coupled or combined together. In the present invention, the crosslink interference means interference generated from a case that an interference-receiving subject is different from an interference-giving subject at a corresponding timing. For example, when the interference-receiving subject is at a DL reception timing and the interference-giving subject is at a UL transmission timing, interference generated from a UL transmission can be called crosslink interference. In the present invention, a UE/base station in position of receiving interference due to crosslink interference shall be represented as a victim UE/TRP and a UE/base station in position of giving interference shall be represented as an aggressor UE/TRP.

Figure 17:
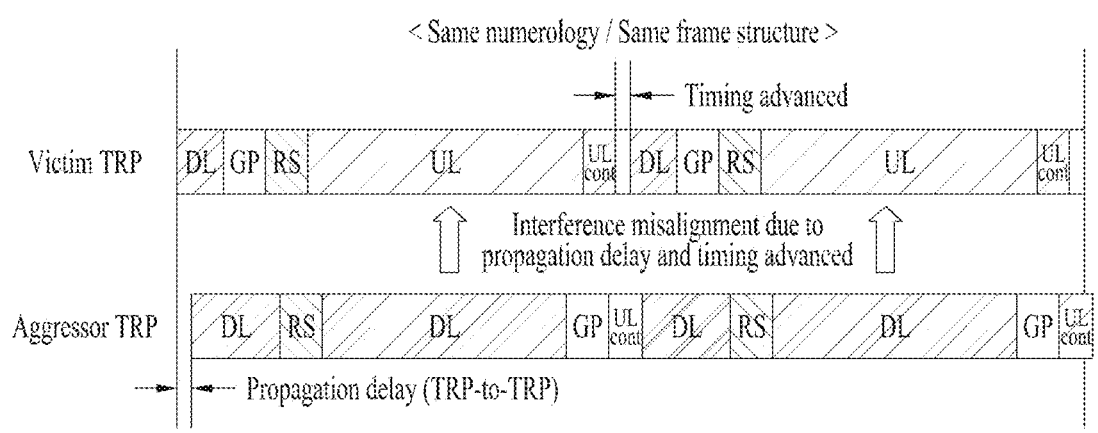
FIG. 17 is a diagram showing one example of a received signal and crosslink interference at TRP.

FIG. 17 is a diagram showing one example of a received signal and crosslink interference at TRP.

In the present invention, an example corresponding to a victim TRP may include a following case. And, it is obvious that other cases are not excluded.

Primary user for a corresponding resource (e.g., if a resource is configured as DL, a DL using device may be a primary user.)

User performing resource configuration along coordinated/intended DL/UL configuration (e.g., assuming that semi-static TDD DL/UL configuration is given, such a user may correspond to a device performing the resource configuration along such configuration.)

Link having a priority set high (e.g., if a backhaul and an access link exist, the backhaul may be set to have a higher priority. Or, in case of WAN and sidelink, a priority of WAN may be higher.)

Device belonging to a priority or primary user group through grouping

A corresponding victim TRP may include a victim device or user despite being called a TRP.

Examples corresponding to an aggressor TRP in the present invention may include the following cases.

Secondary device for a corresponding resource (e.g., if a resource is configured as a DL resource, a device using UL or sidelink may be a secondary user.)

Device failing to perform resource configuration along coordinated/intended DL/UL configuration or intending to perform resource configuration different from intended resource configuration (e.g., assuming that semi-static TDD DL/UL configuration is given, a device failing to perform resource configuration along such a given configuration may correspond to an aggressor TRP.)

Link having a priority set low (e.g., if a backhaul and an access link exist, the access link may be set to have a lower priority. Or, in case of WAN and sidelink, a priority of the sidelink may be lower.)

Device belonging to a priority or secondary user group through grouping

FIG. 17 shows interference due to DL transmission of an adjacent TRP in case of UL reception of a TRP in a TDD based self-contained frame structure. For clarity of description, FIG. 17 shows one example on the assumption that an aggressor TRP and a victim TRP have the same numerology and the same frame structure. Yet, unlike the example shown in FIG. 17, the same problem may be caused in an FDD based DL/UL band or different numerology situation or a different frame structure situation. Here, UEs having received UL grant while connected to a victim TRP (e.g., in an RRC connected state with the victim TRP) send UL signals based on a Timing Advance (TA) value indicated by the victim TRP, whereby a time is advanced in case of UL reception of the victim TRP. The advanced time and the occurrence of a time delay of a received time of a crosslink interference signal at an aggressor TRP due to a propagation delay cause a timing misalignment between a UL received signal and a crosslink interference.

Moreover, in case that a plurality of adjacent aggressor TRPs exist, reception of crosslink interference from each adjacent aggressor TRP is different in viewpoint of reception of a victim TRP due to such a reason that every distance between the adjacent aggressor TRP and the victim TRP is different. Due to such a difference, the victim TRP receives a signal of the crosslink interference in a misaligned state of time synchronization.

In case that timing misalignment occurs between a UL received signal and a crosslink interference, a victim TRP is unable to obtain information (e.g., information such as channel of crosslink interference, crosslink interference pattern, strength of crosslink interference, properties of crosslink interference, etc.) on the crosslink interference attributed to an adjacent aggressor TRP, whereby performance is degraded due to interference on UL signal reception. Therefore, in order to obtain information on crosslink interference of a victim TRP, the following proposals are required.

Proposal 1

For measurement, cancellation or mitigation of crosslink interference, it is proposed to match time synchronization within a Cyclic Prefix (CP) through timing alignment of interference of an adjacent aggressor TRP or a victim TRP.

As described above, in order to obtain timing alignment between a reception of a UL signal and a reception of an interference signal for the purposes of accurate measurement of and information acquisition of crosslink interference, it is proposed to include a timing adjustment by a UE connected to a victim TRP and a timing adjustment by an aggressor TRP as follows.

Particularly, in case of intending to operate with a different configuration by changing a DL/UL direction of a specific subframe or slot into DL from UL for the purpose of resolving the aforementioned asymmetric traffic, i.e., in case that a victim TRP is changed into an aggressor TRP, the aggressor TRP can adjust a TA to be aligned with a reception timing of the victim TRP in order to minimize the influence and interference caused to an adjacent victim TRP without an additional operation of the victim TRP.

On the contrary, in case of intending to operate with a different configuration by changing a DL/UL direction of a specific subframe or slot into UL from DL for the purpose of resolving the aforementioned asymmetric traffic, i.e., in case that an aggressor TRP is changed into a victim TRP, the victim TRP can adjust a TA to be aligned with a reception timing of the aggressor TRP in order to minimize the influence and interference caused by an adjacent aggressor TRP without an additional operation of an existing adjacent TRP. Namely, A TRP intending to change DL/UL configuration for a specific purpose can align time synchronization to be suitable for a state of a neighbor TRP.

Proposal 1-1

As a specific proposal of Proposal 1, it is proposed to send a signaling (e.g., TA value included) to enable a victim TRP to adjust a TA for UL reception in order that interference of a plurality of adjacent TRPs can enter into a CP. Such a scheme of sending a signaling for TA adjustment assumes that an operation such as cancellation and the like may occur in a device receiving a signal from an aggressor TRP for example and is usable for a case that the aggressor TRP performs an interference mitigation technique (e.g., power mitigation), etc. For another example, in case that a UE of an aggressor TRP performs UE-to-UE interference cancellation, the signaling scheme is usable. Yet, in case of this scheme, as a propagation delay coming in each UE is accurately estimated, it is disadvantageous in that a TA of a victim TRP should be adjusted correspondingly.

In doing so, when a TRP sends a TA value to a UE, it can be indicated that the TA value is for measurement or cancellation of crosslink interference.

Figure 18:
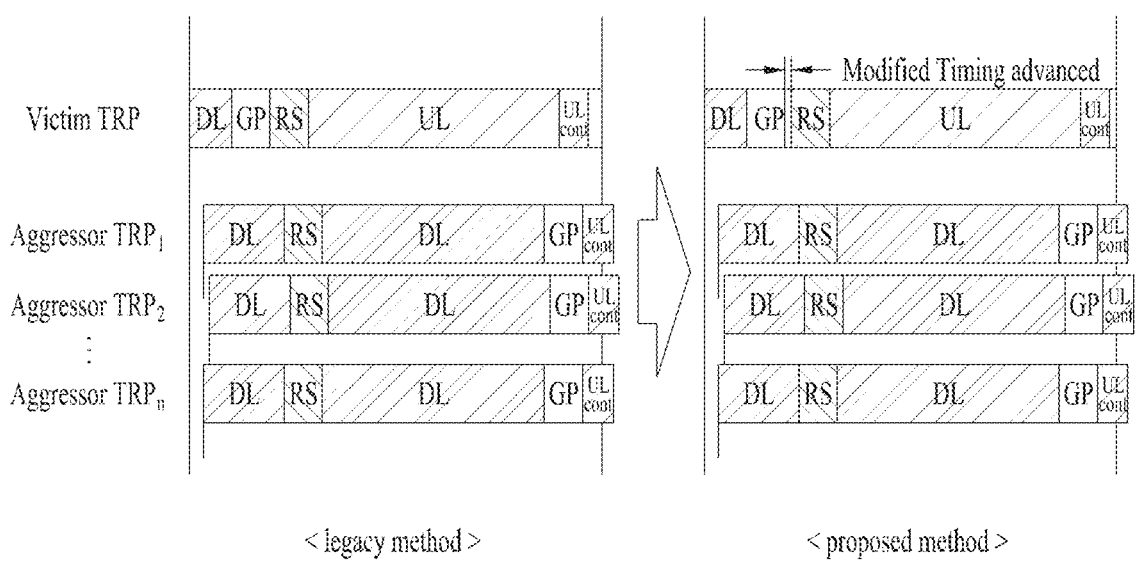
FIG. 18 is a diagram showing one example of a proposed scheme of adjusting a TA of UL reception of a victim TRP.

FIG. 18 is a diagram showing one example of a proposed scheme of adjusting a TA of UL reception of a victim TRP.

As describe above, when interference of a plurality of adjacent TRPs is received in form of timing misalignment, a victim TRP can match up a reception timing with a reception timing of crosslink interference from an aggressor TRP. In order to match up the reception timing with the reception timing of the crosslink interference from the aggressor TRP, the victim TRP can signal a TA value to a UL transmitting UE in a corresponding subframe.

Particularly, since all the interferences of a plurality of adjacent aggressor TRPs generating crosslink interference in a corresponding subframe are asynchronous, a TA of a corresponding UE cannot be aligned with the timings of all crosslink interferences. Hence, in viewpoint of reception of a victim TRP, it is necessary to align a reception timing with the crosslink interference timing of an aggressor TRP having the largest power of the crosslink interference or a plurality of aggressor TRPs having the large crosslink interference. The victim TRP may calculate a time for adjusting a TA by making decision on the basis of the measured or estimated result and then signal the calculated result to each DL receiving UE. Hence, the DL receiving UE may receive a DL signal according to a changed transmission of the aggressor TRP based on the signaling.

Moreover, since a DL/UL transmission direction of an adjacent aggressor TRP may be changeable instantaneously according to a flow of time, the total sum of the crosslink interferences may vary. As described above, in viewpoint of a victim TRP, information of an aggressor TRP having the greatest crosslink interference power or a plurality of aggressor TRPs having the large crosslink interference pow3er may be changed. Therefore, a TA for a reception within a CP with a crosslink interference in a previous subframe and a corresponding TA value after the elapse of time may vary. To cope with the change of the crosslink interference according to the specified time, a periodic or instantaneous signaling is required.

Proposal 1-2

As a specific proposal of Proposal 1, proposed is a signaling for adjusting each subframe/slot boundary of a plurality of adjacent aggressor TRP transmissions in order that interference of a plurality of adjacent TRPs can enter into a CP. Namely, a timing with a victim TRP can be aligned by advancing or deferring a slot boundary a little.

Figure 19:
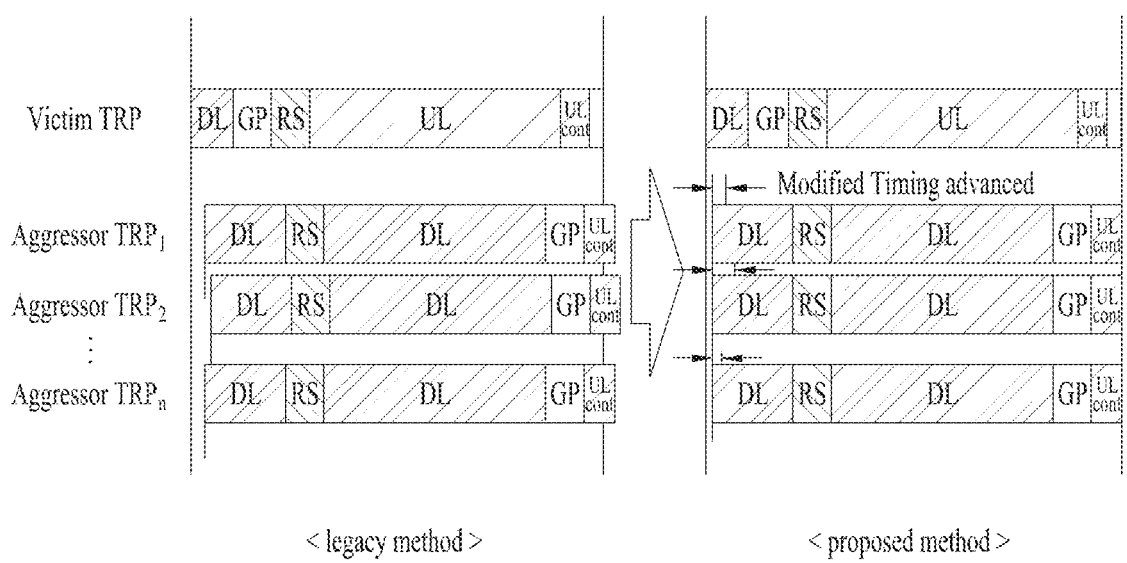
FIG. 19 is an exemplary diagram to describe a proposed scheme of adjusting a TA of each of a plurality of adjacent aggressor TRP transmissions.

FIG. 19 is an exemplary diagram to describe a proposed scheme of adjusting a TA of each of a plurality of adjacent aggressor TRP transmissions.

As illustrated in the proposed scheme of FIG. 19, when interferences of a plurality of adjacent TRPs are received in form of timing misalignment, an aggressor TRP can align a DL transmission timing with a UL reception timing of a victim TRP by applying a TA to a DL signal. To this end, the aggressor TRP can signal a TA value to a UE receiving the DL signal in a corresponding subframe.

In the corresponding subframe shown in FIG. 19, since interferences with a plurality of adjacent victim TRPs affected by crosslink interference are asynchronous, the victim TRP cannot align a UL reception timing with the timings of all crosslink interferences affecting the victim TRPs. For that reason, a single victim TRP having the greatest reception power of crosslink interference or a plurality of victim TRPs having a big reception power of crosslink interference in transmission aspect of an aggressor TRP need to align a DL transmission timing of the aggressor TRP.

In order that the single victim TRP having the greatest reception power of crosslink interference or a plurality of the victim TRPs having a big reception power of crosslink interference align the DL transmission timing of the aggressor TRP, the victim TRP may calculate a time for adjusting a TA by performing measurement or estimation on a timing difference and then transmit the calculated TA adjustment time (including a value for the timing difference) to the aggressor TRP through a signaling between base stations like an X2 interface. If so, each aggressor TRP can transmit information on the signaled TA adjustment time to a UE supposed to receive a corresponding DL signal. And, the corresponding UE can receive the DL signal according to a changed transmission time of the aggressor TRP.

Moreover, since a DL/UL transmission direction of an adjacent victim TRP is instantaneously changeable according to the elapse of time, a target affected by crosslink interference is changeable. Hence, a TA for reception within a CP with crosslink interference in a previous subframe and a corresponding TA value after the elapse of time may vary. To cope with the change of the crosslink interference according to a time, an aggressor TRP needs to signal information on a time for adjusting the calculated TA to the corresponding UE periodically or instantaneously.

Proposal 1-3

Required is a signaling for aligning a timing of transmission/reception corresponding to an aggressor TRP with a transmission/reception timing of a victim TRP according to an intended DL/UL configuration or a determined priority by adjusting a subframe/slot boundary each.

Figure 20:
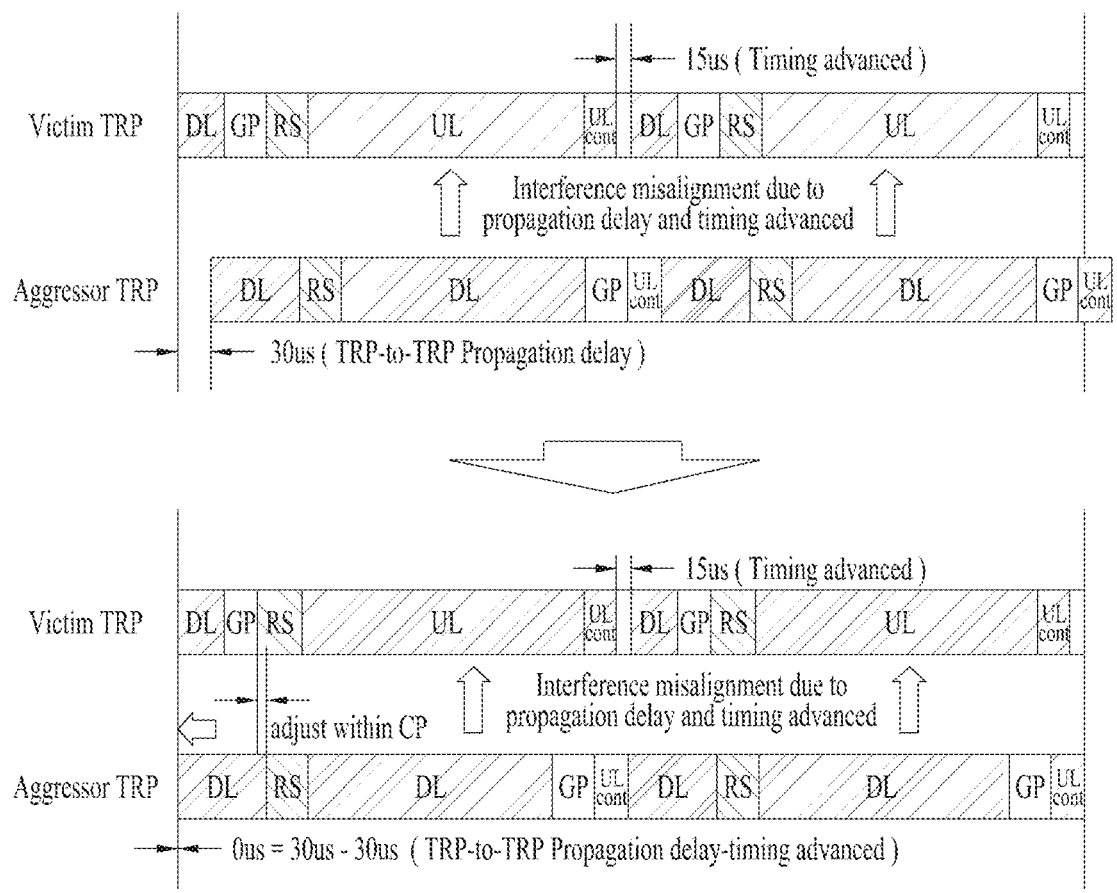
FIG. 20 is a diagram showing one example for an aggressor TRP to change a timing according to an intended DL/UL configuration or a determined priority.

FIG. 20 is a diagram showing one example for an aggressor TRP to change a timing according to an intended DL/UL configuration or a determined priority.

A transmission timing of an aggressor TRP can be adjusted according to an intended DL/UL configuration or a priority of a TRP transmission. Particularly, in order to protect a high-priority TRP (e.g., a TRP changed into a victim TRP in a manner that an adjacent TRP is changed into a different DL/UL configuration without following an intended DL/UL configuration), a low-priority TRP (e.g., a TRP changed into an aggressor TRP in a manner that an adjacent TRP is changed into a different DL/UL configuration without following an intended DL/UL configuration) can adjust a data reception timing and a reception timing of crosslink interference by adjusting a subframe/slot boundary each.

For example, if a DL/UL configuration of a TRP located at an adjacent place is determined as DSUUUDSUUU, a TRP failing to follow this may be an aggressor TRP in a corresponding slot/subframe. In case that such an aggressor TRP performs a transmission by changing into D from intended U, like the Proposal 1-2, a TA of DL transmitted by the aggressor TRP can be aligned with a UL reception timing of a victim TRP. Namely, it is able to align a UL timing of the victim TRP so that a DL transmission timing transmitted by the aggressor TRP is aligned with a reception timing of UL transmitted to the victim TRP by UEs. For example, when a propagation delay between the aggressor TRP and the victim TRP is 30 μs and a propagation delay to the aggressor TRP from a UE connected to the aggressor TRP is 15 μs, the victim TRP adds a TA of 30 μs, whereby the reception by the UE and the reception by the TRP can come into the CP.

In case of intending to perform DL in an intended UL, in order to align a timing of DL of an aggressor with a timing of UL transmitted to a victim TRP by UEs, it can be transmitted in a manner of advancing a time corresponding to the propagation delays of the aggressor TRP and the victim TRP. In doing so, in case of a UE receiving a DL transmission from the aggressor TRP, it means that the reception is achieved by advancing a DL timing. And, the UE can receive it accurately by obtaining such information. Hence, a changed value of a DL transmission timing should be obtained as well as the information indicating that DL is performed in the intended UL.

In the proposals described in the present invention, a signaled TA value may include a negative number as well as a positive number. In a specific situation, a signaled TA value may be set to a negative number. If the TA value is the negative number, it may mean that a transmission is performed by applying a more delay.

Proposal 2

It is proposed to blank a specific symbol independently from matching up a timing alignment of interference of an adjacent aggressor TRP or a victim TRP of Proposal 1 within a CP to measure, cancel or mitigate crosslink interference or perform both blanking the specific symbol and changing the specific symbol simultaneously. Proposal 2 can be embodied together with or separately from Proposal 1.

As described above, although a UE connected to a victim TRP adjusts a timing and an aggressor TRP adjusts a timing, it may be unable to obtain a specific combination to acquire a timing alignment between a UL signal reception and an interference signal reception for the purposes of accurate measurement and information acquisition of crosslink interference. In this case, it is able to consider blanking a specific symbol of a specific TRP after not performing the above-stated TA or performing a partial TA.

Particularly, in case of intending to operate in a different configuration by changing a DL/UL direction of a specific subframe or slot from UL to DL for the purpose of resolving asymmetric traffic, i.e., in case of changing a victim TRP into an aggressor TRP, in order to minimize influence and interference caused to an adjacent victim TRP without performing an additional operation of the victim TRP, it is able to blank a specific symbol possibly affected by the aggressor TRP.

On the contrary, in case of intending to operate in a different configuration by changing a DL/UL direction of a specific subframe or slot from DL to UL for the purpose of resolving asymmetric traffic, i.e., in case of changing an aggressor TRP into a victim TRP, in order to minimize influence and interference caused by an adjacent aggressor TRP without an additional operation of an existing adjacent TRP, it is able to blank a specific symbol possibly affecting the victim TRP. A TRP intending to change a DL/UL configuration for a specific purpose can blank a specific symbol possibly receiving or giving interference to be suitable for a state of a neighbor TRP.

Proposal 2-1

As a specific proposal of Proposal 2, in order to blank a specific resource of an adjacent aggressor TRP transmission giving serious crosslink interference in case of non-presence of a combination for interferences from a plurality of adjacent TRPs to come within a CP, corresponding information can be signaled to a specific aggressor TRP.

Figure 21:
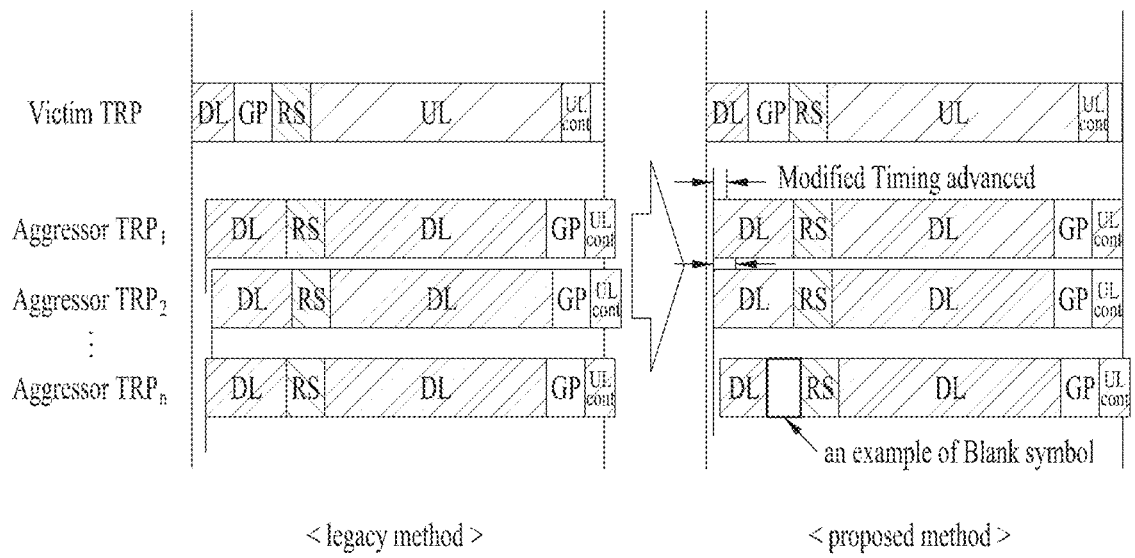
FIG. 21 is a diagram showing one example of a case of a symbol of a DL control as one example of blanking a specific resource of an aggressor TRP transmission.
Figure 22:
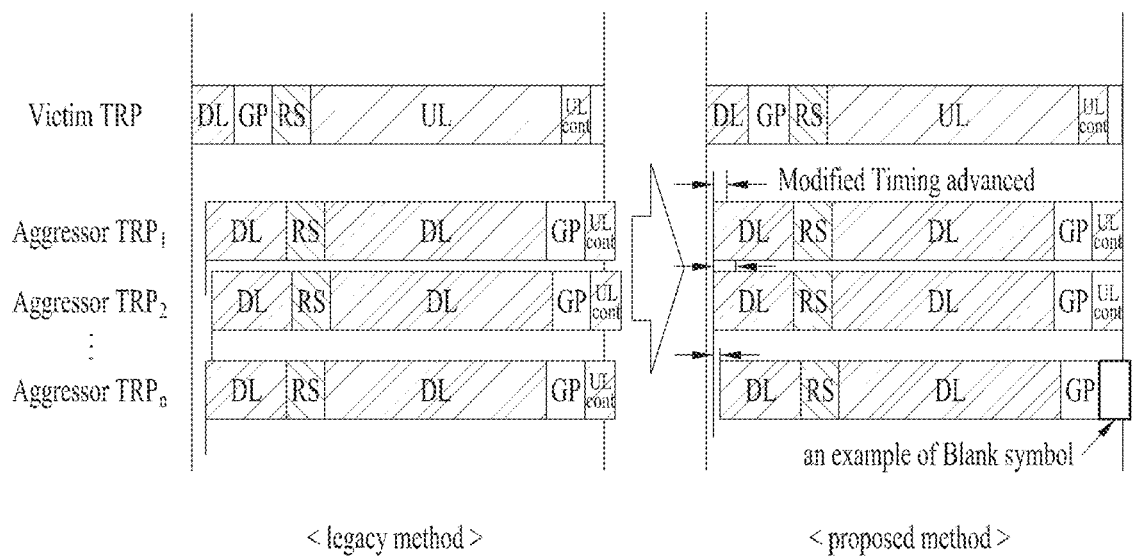
FIG. 22 is a diagram showing one example of a case of a symbol of a UL control as one example of blanking a specific resource of an aggressor TRP transmission.

FIG. 21 is a diagram showing one example of a case of a symbol of a DL control as one example of blanking a specific resource of an aggressor TRP transmission, and FIG. 22 is a diagram showing one example of a case of a symbol of a UL control as one example of blanking a specific resource of an aggressor TRP transmission.

Interferences of a plurality of adjacent TRPs are received in form of timing misalignment, a victim TRP cannot align with a reception timing of a crosslink interference from an aggressor TRP by adjusting a TA of an existing UE, and the aggressor TRP cannot align with a UL reception timing of the victim TRP by applying a TA to a DL transmitted signal. In such a case, it is unable to achieve the objects through Proposal 1-1 and Proposal 1-2. In this case, by blanking a specific resource of an adjacent aggressor TRP currently causing a serious crosslink interference, such objects can be achieved. Namely, if a partial resource of a DL signal of a specific TRP is not used by being blanked, effects of Proposal 1-1 and Proposal 1-2 can be achieved.

To achieve such an object, a victim TRP determines symbol candidates for a blank symbol through measurement of crosslink interference and is able to transmit a result of the determined blank symbol candidate to an aggressor TRP through a signaling between base stations such as X2 interference and the like. The aggressor TRP transmits a result of the determined blank symbol to a DL receiving UE through a signaling and the like, thereby enabling the UE to receive a DL signal according to a changed transmission time of the aggressor TRP.

Moreover, since a DL/UL transmission direction of an adjacent victim TRP is instantaneously changeable according to the elapse of time, a target affected by crosslink interference is changeable. Hence, a blank symbol for reception within a CP with crosslink interference in a previous subframe and a position and value of a corresponding blanked resource after the elapse of time may vary. To cope with the change of the crosslink interference according to a time, a signaling including a result of the determined blank symbol candidate needs to be periodic or instantaneous.

Proposal 2-2

In case that there is no combination for all interferences of a plurality of adjacent TRPs to come into a CP in viewpoint of a victim TRP, a method for resolving timing misalignment for a specific signal only is necessary aside from Proposal 2-1. To solve the timing misalignment problem, it is necessary to perform repetition of a specific signal of an aggressor TRP to work to a timing of a specific signal of a victim TRP according to an intended DL/UL configuration or a determined priority. To this end, the victim TRP can signal the necessary corresponding information to a specific aggressor TRP.

Figure 23:
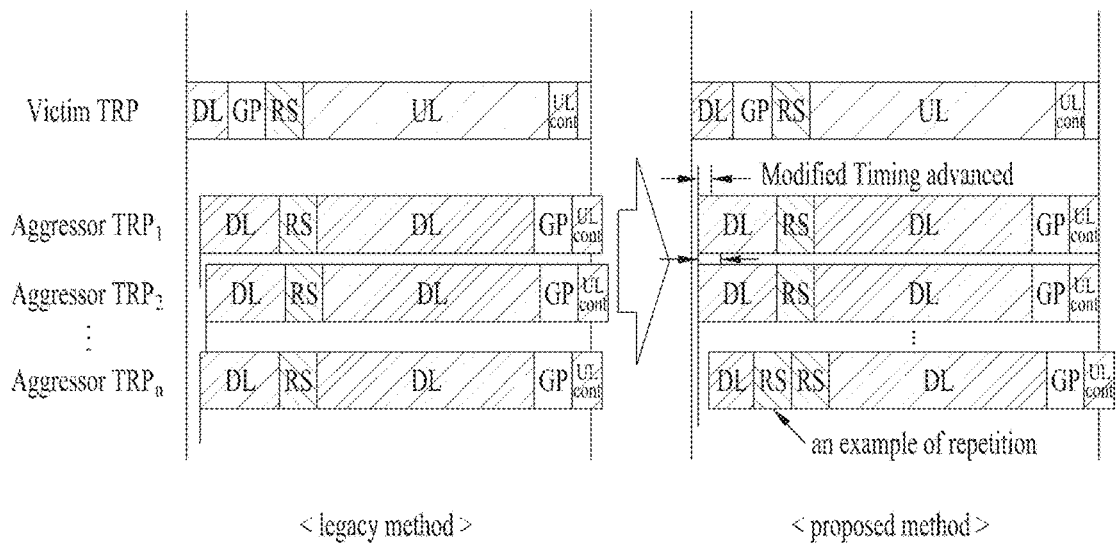
FIG. 23 is a diagram showing one example (e.g., one example of a case of a symbol of a DL control) of utilizing a specific resource of an aggressor TRP transmission for the purpose of RS repetition after blanking the specific resource.

FIG. 23 is a diagram showing one example (e.g., one example of a case of a symbol of a DL control) of utilizing a specific resource of an aggressor TRP transmission for the purpose of RS repetition after blanking the specific resource.

Referring to FIG. 23, interferences of a plurality of adjacent TRPs can be received by a victim TRP in form of timing misalignment. In this case, if the victim TRP is unable to align it with a reception timing of crosslink interference of an aggressor TRP despite adjusting a TA of an existing UE and the aggressor TRP is unable to align it with a UL reception timing of the victim TRP by applying a TA to a DL transmitted signal, it is unable to achieve the above object through Proposal 1-1 and Proposal 1-2.

In such a case, unlike the existing scheme shown in FIG. 23, it is able to achieve the above object for a specific signal only by repeating a specific resource of a transmission of an adjacent aggressor TRP (e.g., aggressor $TRP_n$ in FIG. 23) currently giving serious crosslink interference. Namely, by aligning timings in aspect of RS resources of the adjacent aggressor TRP and the victim TRP in a manner of repeating an RS signal among DL signals of a specific TRP (e.g., aggressor $TRP_n$ in FIG. 23), Proposal 1-1 and Proposal 1-2 can be achieved for a specific signal only.

Proposal 2-3

Figure 24:
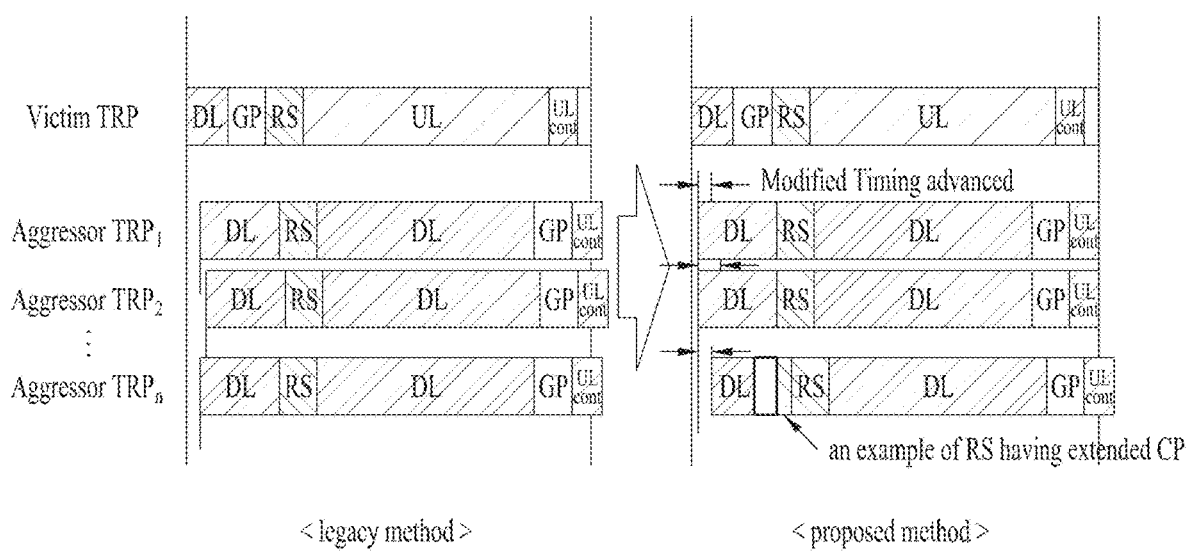
FIG. 24 is a diagram showing one example (e.g., a case of a symbol of a DL control) of utilizing a specific resource for a signal transmission of an aggressor TRP for the purpose of changing a CP of an RS into an extended CP.

FIG. 24 is a diagram showing one example (e.g., a case of a symbol of a DL control) of utilizing a specific resource for a signal transmission of an aggressor TRP for the purpose of changing a CP of an RS into an extended CP.

Interferences of a plurality of adjacent TRPs can be received by a victim TRP in form of timing misalignment.

If there is no combination for enabling all interferences of a plurality of adjacent TRPs to come into a CP in viewpoint of the victim TRP, a method for resolving timing misalignment for a specific signal only is required aside from Proposal 2-1. To solve the timing misalignment problem, it is necessary to perform an operation according to a timing of a specific signal of a victim TRP by extending a CP of a specific signal of an aggressor TRP to an extended CP according to an intended DL/UL configuration or a determined priority. To this end, the victim TRP can signal the necessary corresponding information to a specific aggressor TRP.

Referring to FIG. 24, interferences of a plurality of adjacent TRPs can be received by a victim TRP in form of timing misalignment. In this case, if the victim TRP is unable to align it with a reception timing of crosslink interference of an aggressor TRP despite adjusting a TA of an existing UE and the aggressor TRP is unable to align it with a UL reception timing of the victim TRP by applying a TA to a DL transmitted signal, it is unable to achieve the above object through Proposal 1-1 and Proposal 1-2.

In such a case, unlike the existing scheme shown in FIG. 24, it is able to achieve the above object for a specific signal only by extending a CP of a specific resource of a transmission of an adjacent aggressor TRP (e.g., aggressor $TRP_n$ in FIG. 24) currently giving serious crosslink interference. Namely, timings are aligned in aspect of RS resources of an adjacent aggressor TRP and a victim TRP by extending a CP of an RS among DL signals of a specific TRP (e.g., aggressor TRP$_n$ in FIG. 24), whereby Proposal 1-1 and Proposal 1-2 can be achieved for a specific signal only.

Proposal 2-4

Figure 25:
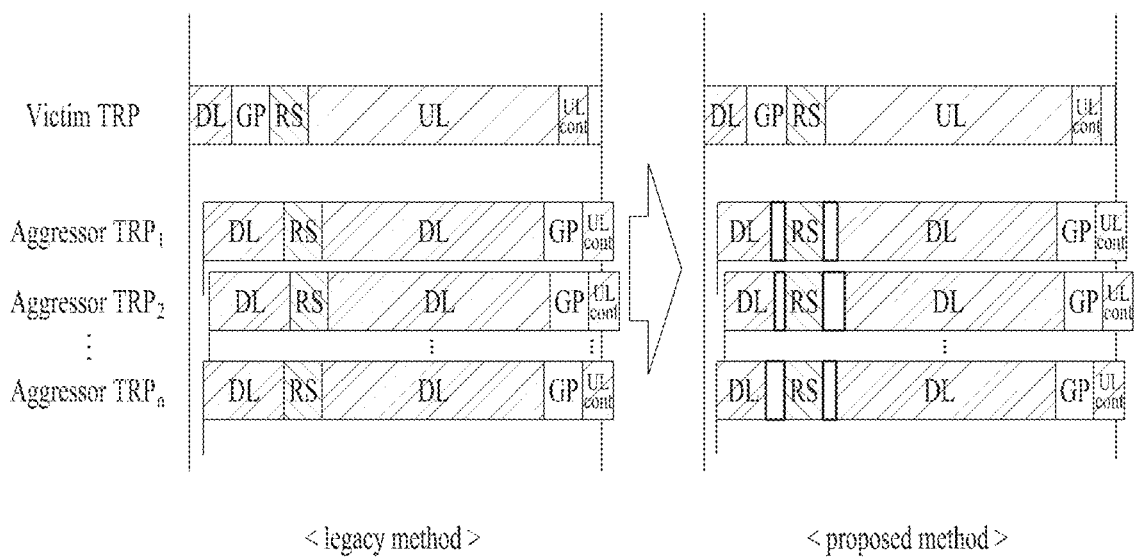
FIG. 25 is a diagram showing one example for an aggressor TRP to change a timing of a partial symbol (RS) according to an intended DL/UL configuration or a determined priority.

FIG. 25 is a diagram showing one example for an aggressor TRP to change a timing of a partial symbol (RS) according to an intended DL/UL configuration or a determined priority.

Interferences of a plurality of adjacent TRPs can be received by a victim TRP in form of timing misalignment.

If there is no combination for enabling all interferences of a plurality of adjacent TRPs to come into a CP in viewpoint of the victim TRP, a method for resolving timing misalignment for a specific signal only is required aside from Proposal 2-1. To solve the timing misalignment problem, it is necessary to perform an operation according to a timing of a specific signal of a victim TRP by adjusting a timing of a partial symbol (e.g., RS symbol) among resources for the aggressor TRP according to an intended DL/UL configuration or a determined priority. To this end, the victim TRP can signal the necessary corresponding information to a specific aggressor TRP.

Referring to FIG. 25, interferences of a plurality of adjacent TRPs can be received by a victim TRP in form of timing misalignment. In this case, if the victim TRP is unable to align it with a reception timing of crosslink interference of an aggressor TRP despite adjusting a TA of an existing UE and the aggressor TRP is unable to align it with a UL reception timing of the victim TRP by applying a TA to a DL transmitted signal, it is unable to achieve the above object through Proposal 1-1 and Proposal 1-2.

In such a case, unlike the existing scheme shown in FIG. 25, it is able to achieve the above object by adjusting a timing of a partial symbol (e.g., RS symbol) among resources for an adjacent aggressor TRP (e.g., aggressor TRP$_n$ in FIG. 25) currently giving serious crosslink interference. Namely, timings are aligned in aspect of RS resources of an adjacent aggressor TRP and a victim TRP by adjusting a timing of a partial symbol (e.g., RS symbol) among resources for a specific TRP (e.g., aggressor TRP$_n$ in FIG. 25), whereby Proposal 1-1 and Proposal 1-2 can be achieved for a specific signal only.

Proposal 3

For Proposal 1 and Proposal 2, it is necessary to quantitatively measure or estimate timing misalignment between a victim TRP and an aggressor TRP. To this end, a specific TRP periodically receives information related to crosslink interference like DL/UL configuration through an Over-The-Air (OTA) signal or a TRP-to-TRP interface (e.g., X2 interface) from an adjacent TRP or receives information related to crosslink interference like DL/UL configuration by making a direct request, thereby using the received information for quantitative measurement for timing misalignment.

On the assumption that a UL received signal of a victim TRP is received at an absolute time due to a TA already determined between a UE and a base station, a timing misalignment difference between the victim TRP and an aggressor TRP can be expressed as a function of a propagation delay of a DL signal transmission of the aggressor TRP and a TA time of a TRP. Particularly, since a position of a TRP is fixed, a propagation time experienced by crosslink interference from an adjacent TRP is fixed inevitably, which can be assumed as calculable in advance on the assumption that the victim TRP is already aware of a layout of an adjacent network. Therefore, the victim TRP needs to receive information such as DL/UL configuration in order to estimate crosslink interference at the victim TRP.

Proposal 3-1

A victim TRP periodically may receive specific timing information of crosslink interference from each aggressor TRP to the victim TRP through an X2 interface, an OTA signal or the like or receive the specific timing information by directly requesting it.

The victim TRP may calculate a specific timing difference of crosslink interference from each aggressor TRP to the victim TRP based on TRP deployment information within a network or estimate a timing difference based on an OTA signal of crosslink interference from each aggressor TRP to the victim TRP [CP detection of an adjacent TRP or signaling of an adjacent TRP can be estimated by blind detection]. The victim TRP may transmit the calculated or estimated timing difference information to each (adjacent) aggressor TRP.

Thus, the victim TRP can transmit the information on the timing difference to each adjacent aggressor TRP through the X interface, the OTS signal, or the like. Having received the information on the timing difference, the each aggressor TRP may perform Proposal 1 or Proposal 2 or inform an adjacent TRP (adjacent victim TRP included) of a presence or non-presence of performing it through an X2 interface or an OTA signal if it is highly probable that crosslink interference will be caused to the victim TRP (e.g., a case that a distance is close, a case that a transmit power is big, a case that a timing difference is big, etc.) based on the information on the timing difference.

The information on the specific timing difference may be transmitted periodically or if requested. For example, since information on a timing difference estimated on the basis of an OTA signal can be estimated based on a periodic signal of a specific TRP, periodic information transmission is possible. Yet, since measureable crosslink interference is determined by DL/UL configuration of an adjacent TRP, such information transmission may be possible in response to a request. Particularly, since timing information made on the basis of location information almost has no change, if TRP deployment information within a network is updated, a corresponding transmission may be possible in response to an additional request.

Proposal 3-2

A corresponding TRP may periodically transmit information on DL/UL configuration to an adjacent TRP through an X2 interface, an OTA signal or the like or transmit such information in response to a request made by the adjacent TRP.

Crosslink interference at a specific timing can be determined by DL/UL configuration of an adjacent aggressor TRP or a victim TRP at the specific timing. For example, if DL/UL configuration of a victim TRP in a corresponding time interval is UL, if DL/UL configuration of an adjacent aggressor TRP is changed into DL from UL, TRP-to-TRP crosslink interference of a corresponding aggressor TRP is generated additionally. On the contrary, if DL/UL configuration of the aggressor TRP in the corresponding time interval is changed into UL from DL, TRP-to-TRP crosslink interference of the corresponding aggressor TRP disappears.

Moreover, for one example, if DL/UL configuration of a TRP connected to a victim UE in a corresponding time interval is DL, if DL/UL configuration of an adjacent aggressor TRP is changed into UL from DL, UE-to-UE crosslink interference of a corresponding aggressor UE is generated additionally. On the contrary, if DL/UL configuration of the TRP connected to the victim UE in the corresponding time interval is changed into DL from UL, the UE-to-UE crosslink interference of the corresponding aggressor UE disappears. DL/UL configuration of an adjacent TRP may become very important information to estimate crosslink interference. Hence, a corresponding TRP periodically transmits information on DL/UL configuration to an adjacent TRP through an X2 interface, an OTA signal or the like or transmits such information in response to a request made by the adjacent TRP, thereby adjusting crosslink interference (e.g., by resource blanking, etc.).

Therefore, in a manner that an adjacent aggressor TRP transmits DL/UL configuration of the adjacent aggressor TRP, which is changeable instantaneously, to a victim TRP or that the victim TRP transmits DL/UL configuration of the victim TRP to the aggressor TRP, it is able to estimate whether crosslink interference corresponds thereto. Based on this estimation, it is able to calculate the timing required for Proposal 1 and Proposal 2. Moreover, it may be able to estimate the required crosslink interference through the proposed DL/UL configuration information together with the information in Proposal 3-1.

DL/UL configuration information may be transmitted between TRPs periodically or in response to a request. As adjacent TRPs periodically share DL/UL configuration information of a specific TRP with each other, estimation of crosslink interference may be possible. Yet, when DL/UL of a specific time interval (e.g., specific subframe, specific slot, etc.) is instantaneously changed without changing DL/UL configuration overall, if DL/UL configuration information is periodically shared, it may be unable to obtain a big gain. In this case, a corresponding TRP intending to instantaneously change DL/UL of a specific subframe or slot can make a request for DL/UL configuration information to an adjacent TRP, or aperiodically transmit DL/UL configuration information to change to the adjacent TRP to the contrary.

Proposal 4

The information on the difference of timing misalignment between the aggressor TRP and the victim TRP according to the estimation or calculation in Proposal 3 and the information indicating whether to perform a TA at the aggressor or victim TRP may need to be signaled through an X2 interface so as to be obtained by an adjacent aggressor TRP or an adjacent victim TRP.

In case of changing a transmission time and a reception time through TA like Proposal 1 and Proposal 2, it is impossible to estimate an accurate time with the information of Proposal 3 only. Therefore, in order to effectively perform the timing adjustment through TA like Proposal 1 and Proposal 2, timing adjustment information should be shared between adjacent base stations and a TA execution value and a presence or non-presence of execution of TA should be coordinated with an adjacent TRP or a UE.

For example, in case that a specific aggressor TRP advances a DL signal by a specific X (here, X is a time unit and can be expressed in ms-unit, symbol-unit or any unit settable as a time) in consideration of influence of an adjacent victim TRP, interference comes into another victim TRP, which currently considers a TA of a UL Signal in consideration of this aggressor TRP instead of one victim, in advance by the advanced time X, thereby causing a serious effect in a multi-TRP situation. To avoid this, another aggressor TRP should perform a transmission at a different time in consideration of the time change amounting to X that is the same time. If so, a crosslink interference and a UL reception time come into a CP in aspect of the victim TRP, whereby timings can be aligned with each other.

Hence, it is necessary for a corresponding TRP to transmit a presence or non-presence of TA execution in an aggressor or victim TRP to an adjacent TRP through an X2 interface as well as information on the timing difference calculated and transmitted in Proposal 3 so that the adjacent TRP can recognize a presence or non-presence of the TA execution.

Proposal 5

As a method for measuring a difference of timing misalignment, an Over-The-Air (OTA) signal can be used. In order for an adjacent aggressor TRP or a victim TRP to obtain information on an estimated or calculated timing difference between an aggressor TRP and a victim TRP or a presence or non-presence of TA execution in the aggressor or victim TRP, it is necessary to share the corresponding information through an X2 interface.

Assumption that timing misalignment is received at an absolute time that is a function of a distance between TRPs is the assumption that can be met only in a TRP that is not moving. Yet, in case that a transmit power of a TRP is changed according to a TRP having mobility or on/off of each TRP, the assumption may be changed. And, it is not appropriate for the above-specified scheme to be used in measuring a timing of UE-to-UE crosslink interference. For this reason, it is necessary to measure a timing of crosslink interference using an OTA signal.

Proposal 5-1

A victim TRP can measure a timing of crosslink interference using a DeModulation RS (DM-TS). For example, if a victim TRP is able to obtain a sequence used for D<-RS of an aggressor TRP through an X2 interface, the victim TRP can estimate a timing of a specific aggressor TRP using the correlation property in a time domain, which may be usable to update an existing information through the proposed measurement result on the basis of a timing value delivered through an existing X2 interface or OTA or an estimated timing value by the scheme such as Proposal 3.

Proposal 5-2

It is able to measure a timing of crosslink interference using a resource such as a DL/UL switching time, a guard time, a blank Resource Element (RE) and the like of a victim TRP.

In order to measure a timing of crosslink interference from an adjacent aggressor TRP, a specific victim TRP intending to perform measurement may need a specific resource for receiving a signal transmitted by an adjacent aggressor TRP without transmitting a data signal. Namely, a victim TRP needs a resource for receiving and measuring a signal transmitted by an adjacent TRP through an OTA signal. In a frame structure, various kinds of vacant time exist. For example, resources such as a DL/UL switching time, a guard time, a blank RE and the like may be possible. It may be possible to measure a timing of crosslink interference of an adjacent aggressor TRP at a time before a UL signal reception after a sufficient switching time in the DL/UL switching time.

Moreover, a victim TRP can measure a timing of crosslink interference of an adjacent TRP with a guard time, a blank RE or the like configured variously to reduce interference.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of controlling crosslink interference and apparatus therefor are industrially applicable to various wireless communication systems such as 3GPP LTE/LTE-A system, 5G communication system, etc.

What is claimed is:

1. A method performed by a transmission and reception point (TRP) in a wireless communication system, the method comprising:
   receiving downlink/uplink configuration information to be used to measure a cross-link interference from at least one adjacent TRP;
   measuring the cross-link interference caused by a neighbor TRP based on the downlink/uplink configuration information;
   determining a value for controlling transmission timing of a downlink signal transmitted by the neighbor TRP based on the cross-link interference; and
   transmitting, to the neighbor TRP, a message through a X2 interface between the TRP and the neighbor TRP, the message including the value,
   wherein the downlink/uplink configuration information is received through the X2 interface.

2. The method of claim 1, wherein the neighbor TRP comprises a TRP having greatest cross-link interference power among aggressor TRPs.

3. The method of claim 1, wherein the value is determined to align the transmission timing of the downlink signal of the neighbor TRP and transmission timing of an uplink signal of the TRP within a cyclic prefix, CP, length.

4. The method of claim 1, wherein the value is determined to adjust a boundary of a subframe of the neighbor TRP.

5. The method of claim 1, further comprising:
   determining a TA value for controlling transmission timing of an uplink signal transmitted by a user equipment, UE;
   transmitting, to the UE, the TA value; and
   receiving, from the UE, the uplink signal that is adjusted according to the TA value.

6. The method of claim 1, further comprising:
   transmitting information informing that the value is used to measure or cancel the cross-link interference.

7. The method of claim 1, further comprising:
   estimating an occurrence of the cross-link interference based on the downlink/uplink configuration information.

8. A transmission and reception point (TRP) in a wireless communication system, the TRP comprising:
   a transceiver; and
   a processor coupled to the transceiver and configured to:
   receive downlink/uplink configuration information to be used to measure a cross-link interference from at least one adjacent TRP;
   measure the cross-link interference caused by a neighbor TRP based on the downlink/uplink configuration information;
   determine a value for controlling transmission timing of a downlink signal transmitted by the neighbor TRP based on the cross-link interference; and
   transmit, to the neighbor TRP, a message through a X2 interface between the TRP and the neighbor TRP, the message including the value,
   wherein the downlink/uplink configuration information is received through the X2 interface.

9. The TRP of claim 8, wherein the neighbor TRP comprises a TRP having greatest cross-link interference power among aggressor TRPs.

10. The TRP of claim 8, wherein the value is determined to align the transmission timing of the downlink signal of the neighbor TRP and transmission timing of an uplink signal of the TRP within a cyclic prefix, CP, length.

11. The TRP of claim 8, wherein the processor is further configured to determine the value to adjust a boundary of a subframe of the neighbor TRP.

12. The TRP of claim 8, wherein the processor is further configured to:
   determine a TA value for controlling transmission timing of an uplink signal transmitted by a user equipment, UE (110);
   transmit, to the UE, the TA value; and
   receive, from the UE, the uplink signal that is adjusted according to the TA value.

13. The TRP of claim 8, wherein the processor is further configured to:
   transmit information informing that the value is used to measure or cancel of the cross-link interference.

14. The TRP of claim 8, wherein the processor is further configured to:
   estimate an occurrence of the cross-link interference based on the downlink-uplink configuration information.

* * * * *